United States Patent [19]
Oonuki et al.

[11] Patent Number: 5,242,721
[45] Date of Patent: Sep. 7, 1993

[54] STRUCTURAL MEMBER OF PIPE SHAPE

[75] Inventors: Masahide Oonuki, Miki; Tetsuo Yamaguchi, Nishinomiya; Akihiro Nakahara, Ibaraki; Mitsunori Miki, Nishinomiya, all of Japan

[73] Assignee: Sumitomo Rubber Industries, Ltd., Hyogo, Japan

[21] Appl. No.: 617,877

[22] Filed: Nov. 26, 1990

[30] Foreign Application Priority Data

| Nov. 27, 1989 | [JP] | Japan | 1-307050 |
| Apr. 23, 1990 | [JP] | Japan | 2-106716 |
| Aug. 8, 1990 | [JP] | Japan | 2-210982 |
| Oct. 19, 1990 | [JP] | Japan | 2-282419 |
| Oct. 25, 1990 | [JP] | Japan | 2-289771 |

[51] Int. Cl.$^5$ .......... F16L 9/22; F16L 11/08; A63B 53/00; B25J 18/06
[52] U.S. Cl. .......... 428/34.5; 428/34.6; 428/34.7; 428/36.8; 428/36.91; 428/36.9; 428/113; 428/250; 428/902; 264/258; 156/245; 156/304.2; 138/174; 138/118; 138/157; 273/80.9; 273/80 B; 901/27
[58] Field of Search ............. 138/174, 118, 177, 157, 138/172, 132; 428/34.6, 34.7, 35.9, 36.4, 36.8, 36.9, 36.91, 113, 36.92, 902, 250, 34.4, 34.5; 264/258; 901/27, 28, 29; 273/80 B, 80 R, 80.9; 156/304.1, 304.2, 245

[56] References Cited

U.S. PATENT DOCUMENTS

| 2,973,783 | 3/1961 | Boe | 138/130 |
| 3,490,983 | 1/1970 | Lee | 428/36.4 |
| 3,999,886 | 12/1976 | Ormiston et al. | 416/104 |
| 4,022,547 | 5/1977 | Stanley | 416/230 |
| 4,057,610 | 11/1977 | Goettler | 138/174 |
| 4,725,060 | 2/1988 | Iwanaga | 273/80 B |
| 4,797,066 | 1/1989 | Stromberg | 416/230 |
| 5,049,422 | 9/1991 | Honma | 428/34.6 |

FOREIGN PATENT DOCUMENTS 1327246 8/1973 United Kingdom .

*Primary Examiner*—Ellis P. Robinson
*Assistant Examiner*—Rena L. Dye
*Attorney, Agent, or Firm*—Birch, Stewart, Kolasch & Birch

[57] ABSTRACT

The present invention provides a pipe-shaped structural member made of fiber reinforced plastics or fiber reinforced rubber utilizing the mechanical property of the material as an anisotropic material. Since the angle of the fibers and/or direction of orientation are made partially different in the circumferential direction of the structural member, and moreover, since part where the angle of fibers and/or direction of orientation are made partially different is at least a part in the thicknesswise direction of the circumferential part, the pipe-shaped structural member shows a peculiar style of deformation, and is applicable to a variety of industrial fields.

23 Claims, 20 Drawing Sheets

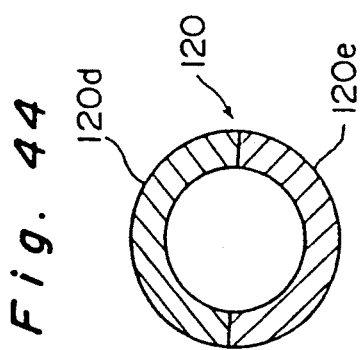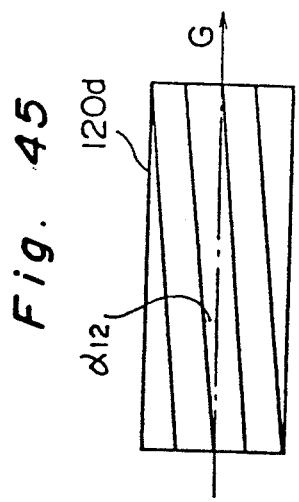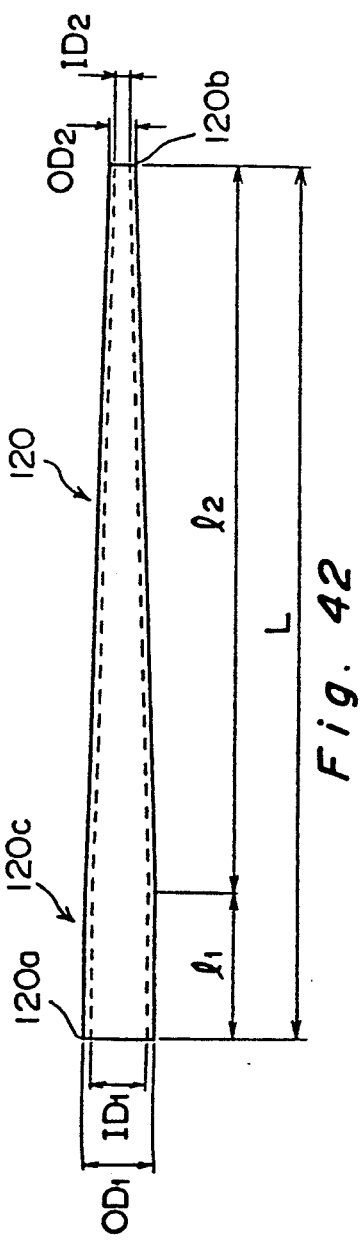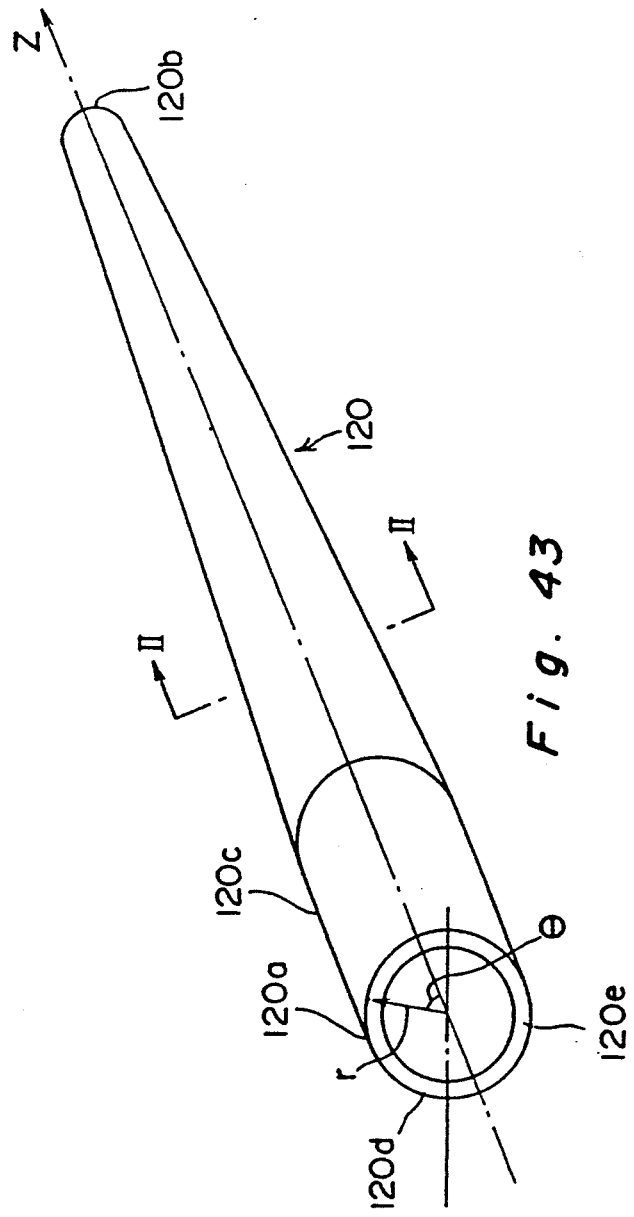

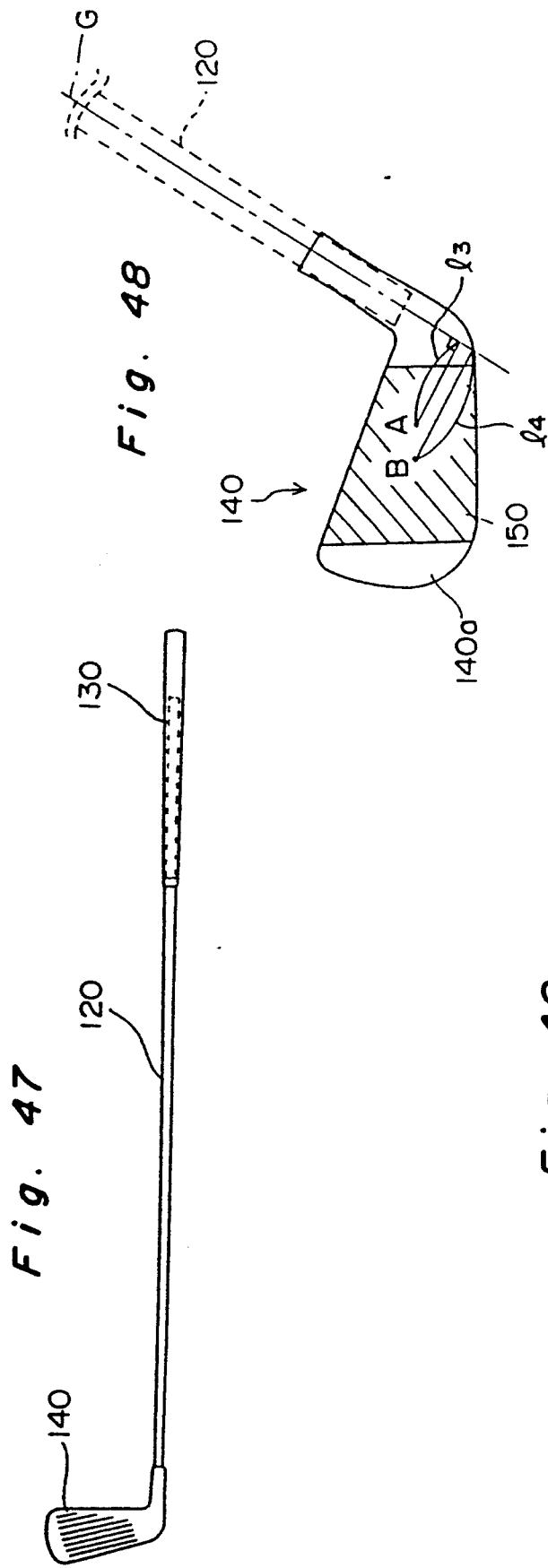
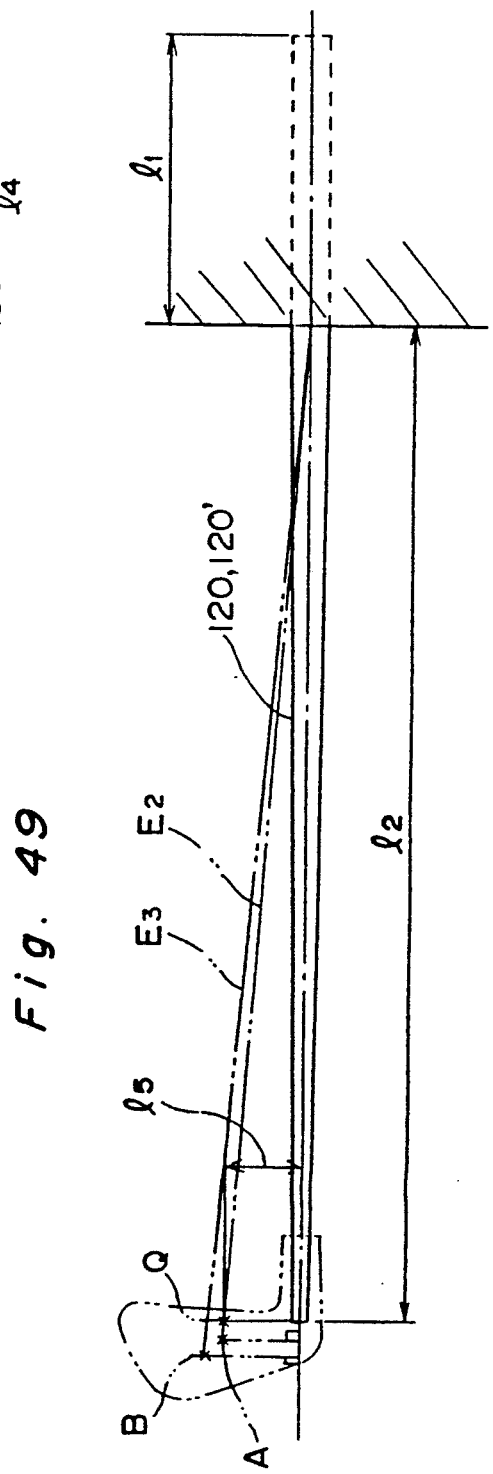
Fig. 47
Fig. 48
Fig. 49

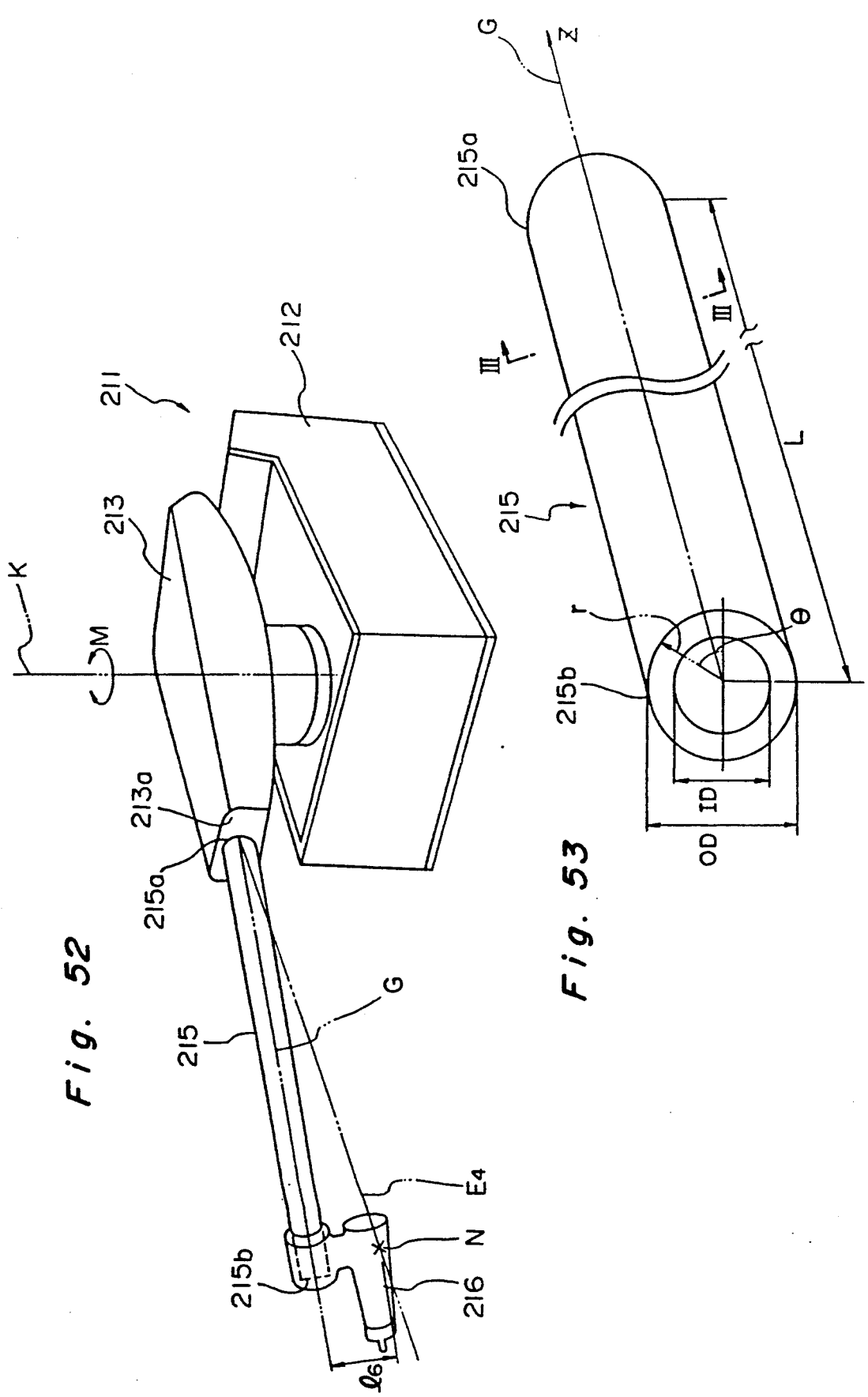

STRUCTURAL MEMBER OF PIPE SHAPE

BACKGROUND OF THE INVENTION

1. Field of the Invention

The present invention generally relates to a structural member having a pipe shape and more particularly, to a pipe-shaped structural member adapted to behave in such a peculiar style of movement as to twist when it is bent, while bending when it is twisted, while utilizing mechanical anisotropy of FRP (fiber reinforced plastics) and/or fiber reinforced rubber. The structural member of the present invention is applicable to a golf club shaft, a robot arm for mechanical work, a pipe structure used the space industrial field or used in toys and the like.

2. Description of the Prior Art

A conventional structural member having a pipe shape and made of an isotropic material such as iron, aluminum, etc., deflects, but does not twist when it is bent by a load applied to a point on the geometric principal axis. On the other hand, it not only deflects but also twists when it is bent and twisted by a load applied to a point not on the geometric principal axis.

More specifically, as shown in FIGS. 61 and 62, if a pipe-shaped structural member 1 made of an isotropic material is applied with a load to the free end 1b thereof, 1a being the fixed end, in a direction shown by an arrow A so that a line of action intersects the geometric principal axis G of the pipe-shaped member, the member 1 deflects as indicated by a chain line in the drawings, without twisting.

In contrast, with reference to FIGS. 63 and 64, if the pipe-shaped structural member 1 is applied with any load to one point at the free end 1b in a direction shown by an arrow B so that the line of action does not cross the geometric principal axis G, the pipe-shaped structural member 1 deflects and twists as indicated by a chain line in the drawings.

Although the pipe-shaped structural member made of isotropic material is conventionally designed to act in the aforementioned manner, the movement thereof, is restricted and no such peculiar action is realized whereby it twists when it is bent and it bends when it is twisted, and moreover it deflects without twisting when it is bent and twisted.

In the meantime, anisotropic material, for example, FRP (fiber reinforced plastics) can achieve the mechanical characteristics not realized by an isotropic material if the direction of fibers therein is controlled.

The FRP has been used heretofore through combination of the other properties thereof other than the mechanical property, e.g., high rigidity and high modulus of elasticity with the thermodynamic, electric or chemical properties of each component. Moreover, although the FRP has been used with an aim to achieve a product of light weight, the mechanical property of the FRP as an anisotropic material has hardly been applied to a positive use.

On the other hand, a fiber reinforced rubber has been proposed as a material with mechanical anisotropy. In comparison with the FRP, the fiber reinforced rubber is low in rigidity and elasticity, so that it is easily deformed and greatly expanded, even by a small force until it ruptures. An orientated rubber shows the same mechanical anisotropy as the fiber reinforced rubber. However, the mechanical property of the orientated rubber and the fiber reinforced rubber has nor been positively utilized.

As described hereinabove, the geometric principal axis and, elastic, principal axis of the conventional pipe-shaped structural member agree with each other. Therefore, in the event such a pipe-shaped structural member is subjected to a bending and twisting load onto the elastic principal axis not coincident with the geometric principal axis, it undesirably causes the member to twist and deflect.

Now, taking a conventional golf club shaft by way of example, as indicated in FIG. 65, the part of a golf club shaft 101 where a grip 102 is attached becomes a fixed end when the player holds the grip 102, and the end of the shaft 101 where a club head 103 is mounted becomes the free end. The elastic principal axis E1 at the free end of the club shaft 101 is coincident with the geometric principal axis G.

Referring further to FIG. 66, in general, the center of gravity A of the weight (hereinafter referred to simply as the center of gravity) of the club head 103 and the geometric center of gravity B of a scoring area 104 indicated by oblique lines on a club face 103a are separated about 20-50 mm away from the geometric principal axis G of the club shaft 101. In other words, the position of the elastic principal axis E1 at the front end of the club shaft 101 is neither coincident with the center of gravity A of the club head, nor with the geometric center of gravity B of the scoring area 104 in the conventional golf club shaft as the player holds the grip 102.

Since the center of gravity of the club head is conventionally not found on the geometric principal axis as mentioned above, the shaft 101 is applied with a bending and twisting moment resulting from the inertia force, on condition that the shaft is added with the eccentric load when the player swings the shaft. As a result, the golf club shaft 101 is not only bent but twisted. Similarly, when the player hits the ball, the repulsive force from the golf ball to the scoring area 104 of the club head 103 gives such moment to the shaft 101 that leads to bending and twisting of the shaft.

Consequent to the bending and twisting of the shaft when the player swings or makes a strike, the face 103a of the club head 103 is rotated to the geometric principal axis G of the shaft 101, and the golf ball is shifted from the intended direction even when the face 103a is turned correctly to the golf ball. Therefore, the player hardly exerts a correct command of direction of the golf ball.

In the meantime, a conventional robot arm 201, for example as shown in FIG. 67, has its fixed end 201a secured to a working body 203 of a robot main body 202. The working body 203 performs a rotating movement (indicated by an arrow C) and a parallel movement (indicated by an arrow D). At the same time, a free end 201b of the robot arm 201 is equipped with a mounting member 205 which is a robot hand for holding a to-be-transferred object 204. The elastic principal axis E2 at the free end 201b agrees with the geometric principal axis G.

However, the center of gravity F of the mounting member 205 itself or the center of gravity J when the mounting member 205 holds the object 204 is not present on the geometric principal axis G. As such, since the mounting member 205 of the conventional robot arm 201 has the center of gravity F not on the geometric principal axis, when the robot arm 201 does not hold the object 204, i.e., when the robot arm 201 starts rotating movement or parallel movement to hold the object, the inertia force of the mounting member 205 works as an eccentric load acting on the center of gravity F, thereby adding a bending and twisting moment to the robot arm 201. As a result, the robot arm 201 is deflected and twisted while generating vibrations when it starts or stops the movement Moreover, also when the mounting member 205 moves while holding the object 204, similar to the above case, since the center of gravity J of the member 205 and object 204 is not on the geometric principal axis G, vibrations due to the deflection and twist of the member 205 are brought about when the rotating movement or parallel movement is started or stopped.

These vibrations resulting from a deflection and distortion of the robot arm 201 adversely affects the accuracy of the stopping position of the arm, making it impossible to hold or position the object 204 correctly at a predetermined position. Particularly, the above-mentioned vibrations give adverse effects to the robot arm with low rigidity or in the case where high accuracy or high speed is required.

SUMMARY OF THE INVENTION

An essential object of the present invention is to provide a structural member having a pipe shape which, utilizing the mechanical property of FRP and fiber reinforced rubber, is adapted to deform in a peculiar behavior such that when one end of the structural member is fixed and the other end thereof is rendered a free end, and a load is applied to the structural member in a direction such that a line of action does not cross the elastic principal axis, it deflects and twists, whereas when a load is applied to a point on the elastic principal axis and it is bent and twisted, it deflects, but without twisting.

It is to be noted here that the elastic principal axis referred to above is not the geometric principal axis, but an axis of symmetry when the modulus of elasticity is taken into consideration According to the present invention, therefore, the elastic principal axis is an axis connecting the fixed end of the structural member and points which deflect but do not twist when a load is applied thereto.

A further object of the present invention is to provide a golf club shaft and a robot arm utilizing the pipe-shaped structural member which does not twist even when applied with a bending and twisting moment on the elastic principal axis thereof, with an aim to solving problems inherent in the conventional golf club shaft and robot arm.

More specifically, since the distortion of the golf club shaft at the time of swinging or impact is reduced according to the present invention, a face of a club head is prevented from being rotated to the geometric principal axis of the shaft. Accordingly, a golf ball can be correctly directed to an aimed direction.

A still further object of the present invention is to provide a robot arm adapted to stop with good accuracy without generating twists or twisting vibrations, and without increasing the weight.

In accomplishing the above-described object, according to the present invention, the pipe-shaped structural member is made of fiber reinforced plastics (referred to as FRP hereinbelow), wherein an angle of the fibers in the fiber reinforced plastics is made partially different in the circumferential direction thereof. Moreover, the part where the angle of fibers is made different is at least a part in the thicknesswise direction (i.e. in the radial direction) of the circumferential part.

Namely, the pipe-shaped structural member according to the present invention is made of an elongated cylindrical shaped resin having a predetermined thickness measured in a radial direction thereof, comprising:

a first part of said cylindrical shape resin expanding in an arc along a circumferential direction at an angle of less than 360°;

unidirectional reinforcing fibers embedded in said first part for reinforcing said member in a first direction;

a second part of said cylindrical shape resin;

unidirectional reinforcing fibers embedded in said second part for reinforcing said member in a second direction which is different from said first direction, said first part being made different from said second part in the circumferential direction of, said member, and each of said parts being at least one part in the thicknesswise of said circumferential part.

In one aspect, the pipe-shaped structural member according to the present invention is made of a fiber reinforced rubber, wherein the angle of the fibers of the fiber reinforced rubber is made partially different in the circumferential direction thereof and the part where the angle of the fibers is made different is at least the part in the thicknesswise direction of the circumferential part.

In another aspect, a pipe-shaped structural member made of an elongated cylindrical shaped orientated rubber having a predetermined thickness measured in the radial direction thereof, comprises:

a first part of said cylindrical shape rubber expanding in an arc along the circumferential direction at an angle less than 360° and having a unidirectional orientation in a first direction;

a second part of said cylindrical shape rubber having a unidirectional orientation in a second direction which is different from said first direction, said first part being made different from said second part in the circumferential direction of said member, and each of said parts being at least one part in a thicknesswise of said circumferential part.

It is preferable to constitute the pipe-shaped structural member by laminating together resinous sheets (prepreg sheets or the like) containing fibers, rubber sheets containing fibers or orientated rubber sheets.

In any of the pipe-shaped structural members made of FRP and fiber reinforced rubber having anisotropy, the parts where the angle of fibers is made different are arranged symmetric to each other to the geometric principal axis of the structural member. For example, the angle of fibers in the part where $0° \leq \theta < 180°$ in the circular cylindrical coordinates of the pipe-shaped structural member is different from that in the part where $180° \leq \theta 360°$. Moreover, if the angle of the fibers in the part $0° \leq \theta 180°$ is orientated in a positive direction to the geometric principal axis, it is preferable that the angle of the fibers in the symmetric part where $180° \leq \theta < 360°$ is orientated in a negative direction to the geometric principal axis.

Furthermore, the pipe-shaped structural member according to the present invention includes such one that is composed of two or more kinds of anisotropic materials among FRP, fiber reinforced rubber and orientated rubber. That is, the pipe-shaped structural member may be formed of a combination of:

a. FRP and fiber reinforced rubber;

b. FRP and orientated rubber;

c. FRP, fiber reinforced rubber and orientated rubber; or d. fiber reinforced rubber and orientated rubber.

The angle of the fibers and/or the direction of orientation are partially made different in the circumferential direction of the pipe-shaped structural member, and at the same time, the part where the angle of the fibers and/or direction of orientation are made different is at least a part in the thicknesswise direction of the circumferential part.

The pipe-shaped structural member according to the present invention further includes one that is obtained by combining either a resin not containing fibers and not having mechanical anisotropy (hereinafter referred to as an isotropic resin) and a rubber not containing fibers and not having mechanical anisotropy (hereinafter referred to as an isotropic rubber) with the above-described three kinds of anisotropic materials or the combination of two or more kinds of the three materials, e.g.:

a. FRP and isotropic resin;
b. FRP and isotropic rubber;
c. fiber reinforced rubber and isotropic resin;
d. fiber reinforced rubber and isotropic rubber;
e. fiber reinforced rubber, orientated rubber and isotropic rubber; or
f. FRP, orientated rubber and isotropic resin.
g. orientated rubber and isotropic resin.
h. orientated rubber and isotropic rubber.

In this model of the pipe-shaped structural member as well, the angle of the fibers and/or direction of orientation are partially made different in the circumferential direction, and moreover, the part where the angle of fibers and direction of orientation are made different is at least a part in the thicknesswise direction of the circumferential part.

For reinforcing fibers of the FRP, a woven fabric, a mat or the like formed of glass fibers, carbon fibers, various kinds of organic fibers, alumina fibers, silicon carbide fibers, metallic fibers and/or fibers made of a mixture of the above fibers are used, while a polyamide, an epoxy, a polyester, etc. is used for the resin.

Meanwhile, for the reinforcing fibers of the fiber reinforced rubber, for example, a woven-fabric or a mat formed of glass fibers, carbon fibers, various kinds of organic fibers, alumina fibers, silicon carbide fibers, metallic fibers and/or mixtures of the above fibers is used. For the rubber of the fiber reinforced rubber, NR, CR, NBR, BR, EPDM, SBR or the like, blended rubbers or copolymerized rubber of these rubbers, etc. is suitable.

Moreover, an example of the orientated rubber, is one obtained by kneading a rubber composite containing 100 parts by weight of a basic material, 3–100 parts by weight of $\alpha,\beta$-unsaturated fatty acid metallic salt and 0.5–5.0 parts by weight of an organic peroxide, and not containing the other orientation applicator with a shearing force added in one direction, and vulcanizing the same.

The polyamide, polyester or the like resin is suitable for the isotropic resin and NR, CR, NBR, BR, EPDM, SBR, etc. or a blended rubber or a copolymerized rubber of these rubbers is appropriate as the isotropic rubber.

According to the present invention, the golf club shaft and robot arm are made of fiber reinforced plastics with anisotropy wherein the angle of the reinforcing fibers is partially made different in the circumferential direction thereof, and moreover at least at a part in the thicknesswise direction thereof, whereby the elastic principal axis is able to be set at a desired position.

More specifically, the golf club shaft according to the present invention is made of a pipe of fiber reinforced plastics wherein the angle of the reinforcing fibers is made different partially in the circumferential direction and moreover, at least at a part thereof in the thicknesswise direction. Presuming that the grip side of the shaft of a golf club is rendered the fixed end, the elastic principal axis at the other free end of the shaft where the head is mounted can be set at a desired position. Moreover, the elastic principal axis in a vertical direction to the face of the head is arranged to pass the center of gravity of the head, or the geometric center of gravity of a scoring area. It is to be noted here that it is preferable to set the shift or deviation of the elastic principal axis at the end of the shaft in a vertical direction to the face from the geometric principal axis to be 20–50 mm when the shaft is fixed at a point 200 mm from the end of the grip.

The robot arm according to the present invention is made of a pipe of fiber reinforced plastics, having one end fixed to a working body and the other free end coupled to a mounting member such as a robot hand for holding an object or a gun sprayer, etc. The angle of the reinforcing fibers is partially made different in a circumferential direction of the pipe, and at the same time, it is made different at least at a part in the thicknesswise direction of the pipe. Accordingly, the elastic principal axis of the robot arm can be set at a desired position to pass the center of gravity of the above mounting member or the center of gravity of both the mounting member and object to be held by the mounting member.

The golf club shaft and robot arm according to the present invention may be entirely formed of the fiber reinforced plastics, or it may be possible to blend such anisotropic material as fiber reinforced rubber, orientated rubber and/or resin or rubber not containing fibers with the fiber reinforced plastics for a part of the golf club shaft or robot arm.

Moreover, the constitution of each of the golf club shaft and robot arm may be kept the same all over in an axial direction thereof, but it may be changed.

BRIEF DESCRIPTION OF THE DRAWINGS

This and other objects and features of the present invention will become apparent from the following description taken in conjunction with preferred embodiments thereof with reference to the accompanying drawings, in which:

FIG. 42 is a plane view of a golf club shaft according to a preferred embodiment of the present invention;

FIG. 43 is a perspective view of FIG. 42;

FIG. 44 is a cross sectional view taken along a line II—II of FIG. 43;

FIGS. 45 and 46 are schematic views explanatory of an angle of fibers in the golf club shaft of FIG. 42;

FIG. 47 is a schematic view of the golf club shaft when mounted with a club head and a grip;

FIG. 48 is a schematic view of the club head (iron);

FIG. 49 is a schematic plane view of the golf club shaft when fixed at one end thereof;

FIG. 52 is a schematic perspective view of a robot machine equipped with a robot arm according to a preferred embodiment of the present invention;

FIG. 53 is a schematic perspective view of the robot arm in the robot machine;

DETAILED DESCRIPTION OF THE PREFERRED EMBODIMENTS

Figure 1:
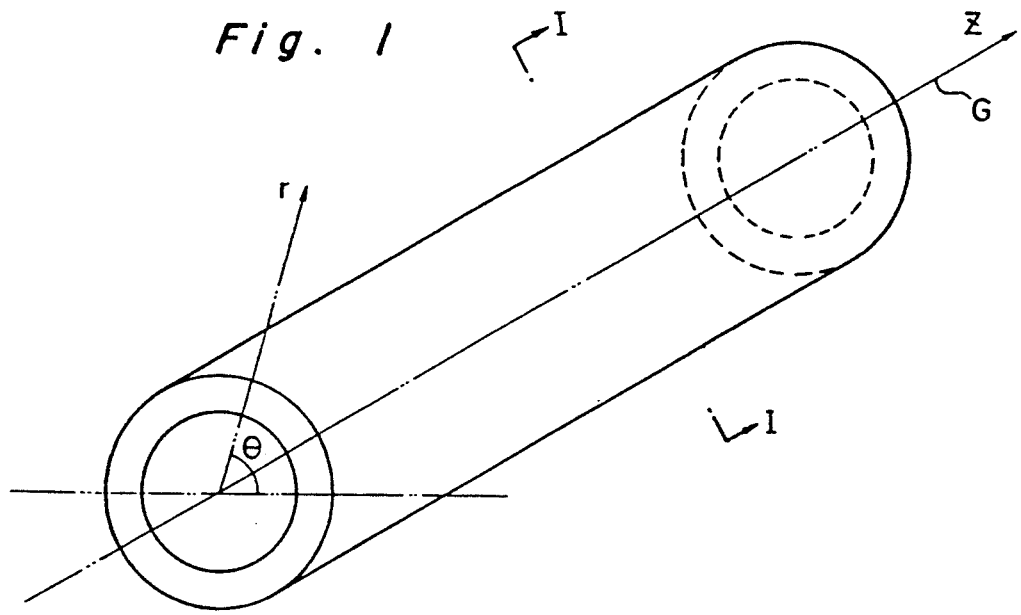
FIG. 1 is a perspective view of a structural member of a pipe shape according to a first embodiment of the present invention.

Before the description of the present invention proceeds, it is to be noted here that like parts are designated by like reference numerals through the accompanying drawings.

Although the present invention may be embodied in various models through a combination of materials, it will be discussed hereinbelow for every combination of materials for facilitation of understanding. Three kinds of materials having anisotropy are used in the embodiments described below, namely (A) fiber reinforced plastics (FRP);

(B) fiber reinforced rubber (FRR); and (C) orientated rubber.

Moreover, two kinds of the following materials are used for the material having isotropy, i.e.:

(D) isotropic resin (of a general type not containing fibers and not having anisotropy); and (E) isotropic rubber (of a general type not containing fibers and not having anisotropy).

The pipe-shaped structural member according to the present invention composed of a combination of the aforementioned kinds of materials can be classified into five models as follows:

1) a model composed of one kind of the material having anisotropy, i.e., made of FRP only in the above item (A), made of FRR only in the item (B), or made of orientated rubber only in the item(C);

2) a model composed of two kinds of materials having anisotropy, i.e., made of FRP in item (A) and FRR in item (B), or made of materials of (A) and (C), or made of materials of (B) and (C);

3) a model composed of three kinds of materials having anisotropy, i.e., made of materials of (A), (B) and (C);

4) a model composed of a combination of materials of the same kind having anisotropy and isotropy, i.e., made of a combination of materials of (A) and (D), or (B) and (E), or (B) and (C) and (E); and 5) a model composed of a combination of materials of different kinds, resin or rubber, among resin containing fibers, rubber containing fibers, orientated rubber, isotropic resin and isotropic rubber, i.e., made of a combination of materials of (A) and (E), or (B) and (D), or (A) and (B) and (D), etc.

Now, the above five models of the present invention will be discussed more in detail.

Figure 2:
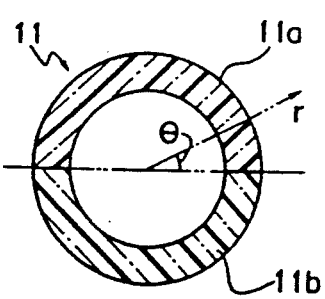
FIG. 2 is a cross sectional view taken along line I—I of FIG. 1.
Figure 3:
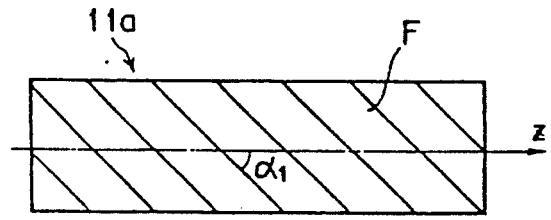
FIGS. 3 and 4 are schematic views showing the direction of fibers in the pipe-shaped structural member of the first embodiment.
Figure 4:
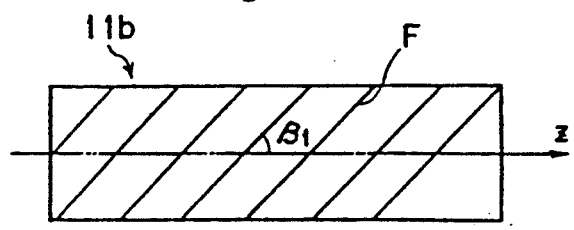

It is to be noted here that the pipe-shaped structural member is completely in the same form in all of the following embodiments, more specifically, a cylindrical form with the inner and outer circumferences thereof in cross section being coaxial, as shown in FIG. 1. For the convenience of explanation, circular cylindrical coordinates $[r, \theta, Z]$ are employed so that a geometric principal axis G of the pipe-shaped structural member is the axis Z. Moreover, the cross-hatching in each cross sectional view is unrelated to the direction of the fibers or the like, but merely represents the material of the structural member, etc. as follows;

* thick solid line . . . fiber
* thin solid line . . . rubber
* thin broken line . . . orientated rubber
* thin one-dot chain line . . . resin 1) model composed of one kind of anisotropic material (1) model made of FRP only Referring to FIGS. 2-4, the pipe-shaped structural member 11 according to a first embodiment of the present invention is made of FRP only. The member 11 is an elongated cylindrical shaped and has a predetermined thickness measured in a radial direction thereof. According to this first embodiment, the pipe-shaped structural member is manufactured by so laminating prepreg sheets of a resin containing fibers as to maintain a desired angle to the geometric principal axis G (that is, the Z axis in the circular cylindrical of coordinates). However, the manufacturing method of the structural member is not restricted to the lamination of prepreg sheets, but may encompass the FW method (filament winding method) whereby continuous fibers are impregnated with a resin and then placed on a mandrel with a predetermined angle in an axial direction.

As is shown in FIGS. 2-4, the pipe member 11 comprises a first part 11a and a second part 11b. The parts 11a and 11b are of cylindrical shape extending in an arc along a circumferential direction, with a unidirectional reinforcing fibers embedded in the cylindrical shaped resin structure. The angle of all the fibers in the positive direction to the Z axis is set to be 30° in the first part 11a where $0° \leq \theta < 180°$ irrespective of the values of r and Z. It is enough that α1 is larger than 0° and not equal to 180°.

On the other hand, in the second part 11b of FIG. 4 where $180° \leq \theta < 360°$, an angle of all fibers β1 in the negative direction to the Z axis is $-30°$. In other words, β1 is set to be $-α1$.

As described hereinabove, the angle of the fibers F in a part in the circumferential direction of the pipe-shaped structural member 11 to the geometric principal axis G is made different from that in a part symmetric to the above part to the geometric principal axis G. Therefore, because of the known anisotropic characteristic of FRP, a deviation is produced between the geometric principal axis G and the elastic principal axis E of the pipe-shaped structural member 11 of the present embodiment.

The operational property of the pipe-shaped structural member having the above-depicted structure will be described below Referring to FIG. 5, the pipe-shaped structural member 11 is fixed at one end 11c, the other end thereof being a free end 11d, so that the structural member 11 is cantilevered to have a length L'. A point Q in FIG. 5 is a crossing point of the elastic principal axis E with the lateral face of the free end 11d.

Figure 5:
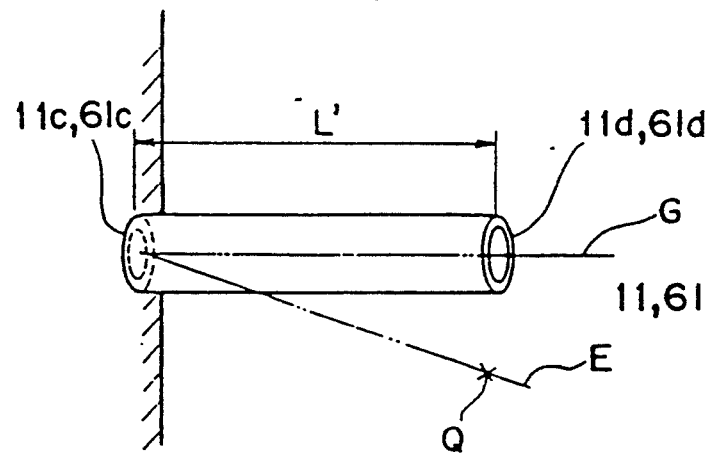
FIG. 5 is a perspective view of the pipe-shaped structural member when it is fixed at one end thereof.
Figure 6:
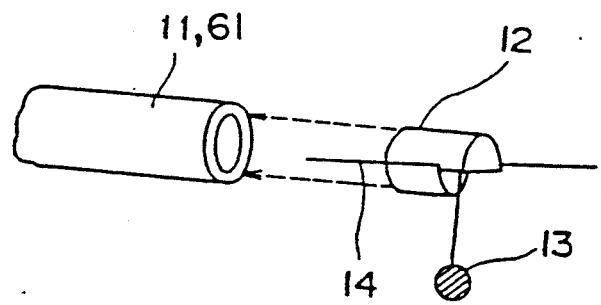
FIGS. 6 and 7 are perspective views explanatory of how to mount an instrument for experiments.
Figure 8:
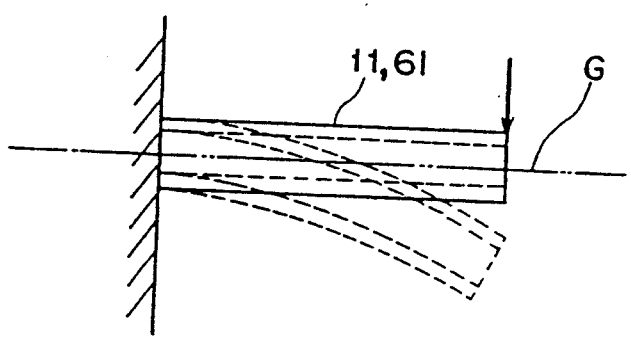
FIGS. 8 through 11 are schematic views showing deformation of the pipe-shaped structural member when it is applied with a load at the free end thereof.
Figure 9:
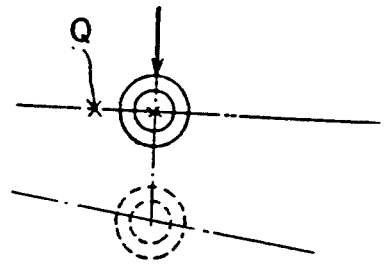

In the state as illustrated in FIG. 5, when a tool 12 is inserted into a front end of the member 11 and a weight 13 is hung from the tool 12 so as to apply a load not passing a point on the elastic principal axis E downwards as shown in FIG. 6, the structural member 11 deflects and twists as indicated by a chain line in FIGS. 8 and 9.

Figure 7:
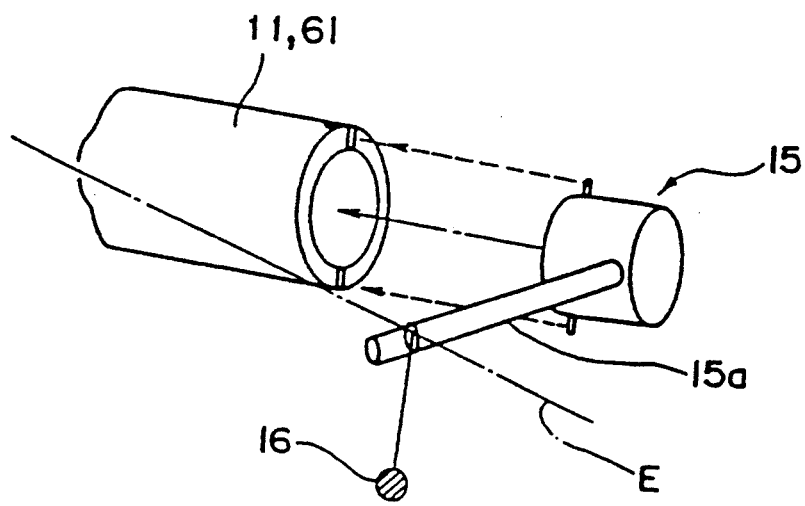
Figure 10:
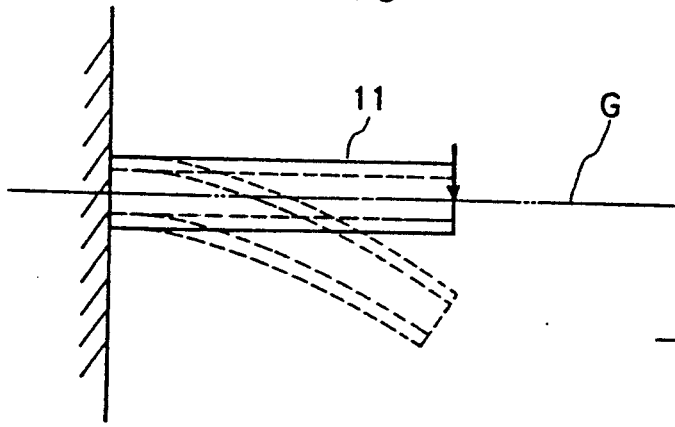
Figure 11:
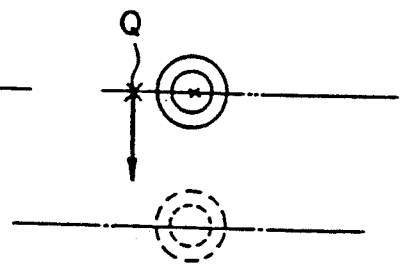

On the contrary, if a tool 15 is inserted from the front end of the structural member 11 and a weight 16 is hung from a projecting rod 15a of the tool 15, so that a load passing the point Q on the elastic principal axis E is applied downwards as shown in FIG. 7, the structural member 11 deflects, but without twisting as indicated by a chain line in FIGS. 10 and 11.

Therefore, the pipe-shaped structural member 11 according to the present embodiment not only deflects but twists when a load is applied thereto in a direction passing a point not on the elastic principal axis E, while it deflects, but never twists even if it is bent and twisted through application of a load to a point on the elastic principal axis E.

An equation $\beta 1 = -\alpha 1$ is held according to the first embodiment. However, the relation between α1 and β1 is not limited to this equation, but may be sufficient as long as α1 is not equal to β1.

Figure 39:
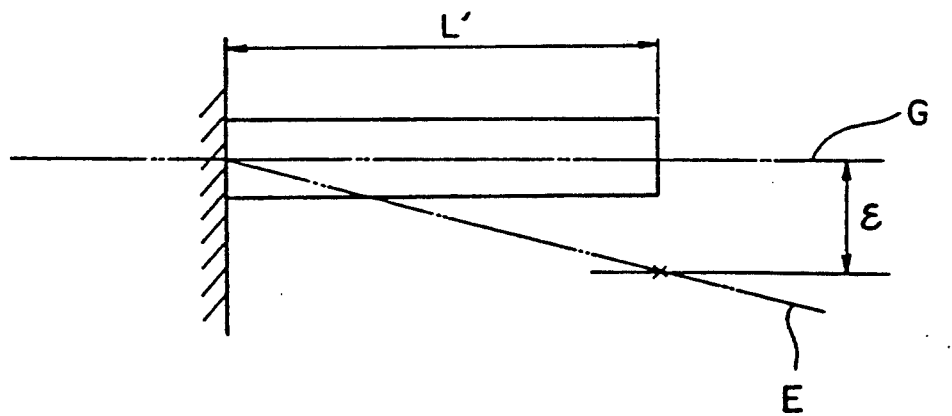
FIG. 39 is a schematic view showing the deviation of the geometric principal axis to the elastic principal axis at a free end of the pipe-shaped structural member (seen from above in FIG. 38)

Supposing that the amount of deflection of the structural member 11 is δ and the amount of twist or distortion thereof is τ, the shift or deviation ε of the elastic principal axis to the geometric principal axis (indicated in FIG. 39) at a free end of the pipe-shaped structural member of the first embodiment, while the other end is fixed, is represented by the following approximate equation;

$$\delta = \frac{PL'^3}{3\pi R^3 h} S11 + \frac{TL'^2}{\pi^2 R^3 h} S16$$

$$\tau = \frac{PL'^2}{\pi^2 R^3 h} S16 + \frac{TL'}{2\pi R^3 h} S66$$

$$\epsilon = -\frac{2}{\pi} \frac{S16}{S66} L'$$

wherein R represents a radius of the pipe-shaped structural member at the center in a thicknesswise direction, L' being a length of a projecting part from the fixed end of the structural member, P being a load applied to the front end, T being a torque applied to the front end, and S11, S16 and S66 being constants determined respectively by the fibers, resin and structure of the lamination constituting the FRP.

Figure 12:
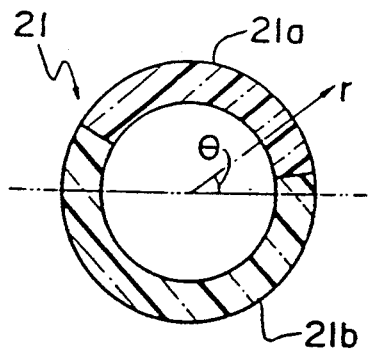
FIG. 12 is a cross sectional view of a first modification of the piped-shaped structural member according to the first embodiment taken along the line I—I of FIG. 1.
Figure 13:
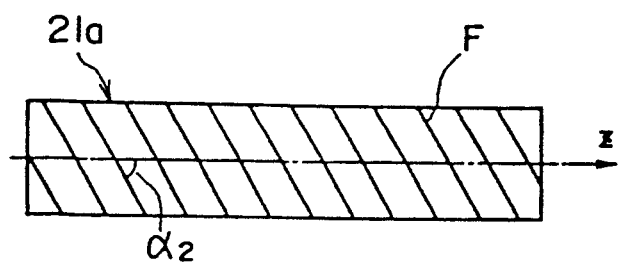
FIGS. 13 and 14 are schematic views showing the direction of fibers in the piped-shaped structural member of the first modification.
Figure 14:
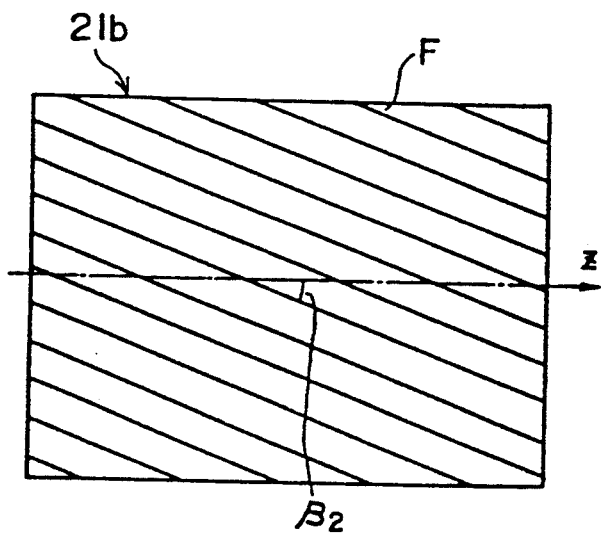
Figure 15:
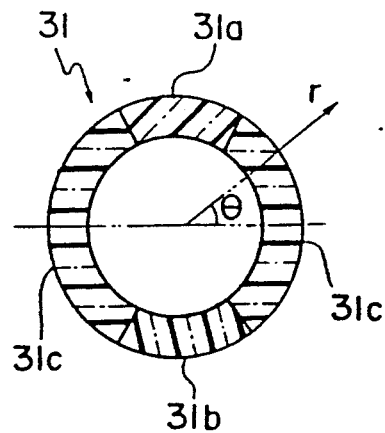
FIG. 15 is a cross sectional view of a second modification of the pipe-shaped structural member according to the first embodiment taken along the line I—I of FIG. 1.

A first modification of the pipe-shaped structural member of the first embodiment is illustrated in FIGS. 12 through 14. In a pipe-shaped structural member 21 according to the first modification, it is so arranged that the angle of all the fibers to the geometric principal axis G at a part 21a where $10° \leq \theta < 150°$ is set to hold $\alpha 2 = 60°$ as shown in FIG. 13, and the angle of fibers in the other parts 21b than the part 21a where $0° \leq \theta < 10°$ and $150° \leq \theta < 360°$ is set to hold $\beta b = 20°$ as indicated in FIG. 14. However, the relation between $\alpha 2$ and $\beta 2$ is not restricted to the above, but may be sufficient as long as $\alpha 2$ is not equal to $\beta 2$. Further, the parts 21a and 21b may be defined in a different manner of angles.

According to the first modification, since the angle of fibers F in the first part of the structural member in the circumferential direction thereof to the geometric principal axis is made different from that in the second parts symmetric to the first part, the elastic principal axis is shifted from the geometric principal axis, whereby the same effect is gained as in the first embodiment.

Figure 16:
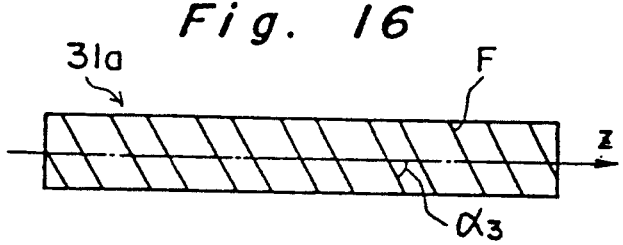
FIGS. 16 through 18 are schematic views showing the direction of fibers in the piped-shaped structural member of the second modification.
Figure 17:
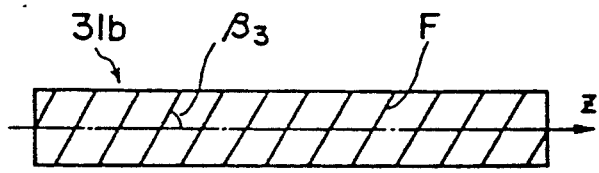

Referring further to FIGS. 15 through 18, a second modification of the first embodiment is illustrated therein. In the second modification, an angle $\alpha 3$ of all the fibers F in the first part 31a of a pipe-shaped structural member 31 where $60° \leq \theta < 120°$ is set to be 60° as indicated in FIG. 16, while an angle $\beta 3$ at a second part 31b where $240° \leq \theta < 300°$ is set to be $-60°$ as indicated in FIG. 17. It is to be noted here that $\alpha 3$ and $\beta 3$ are any values as long as $\alpha 3$ is not equal to $\beta 3$.

Figure 18:
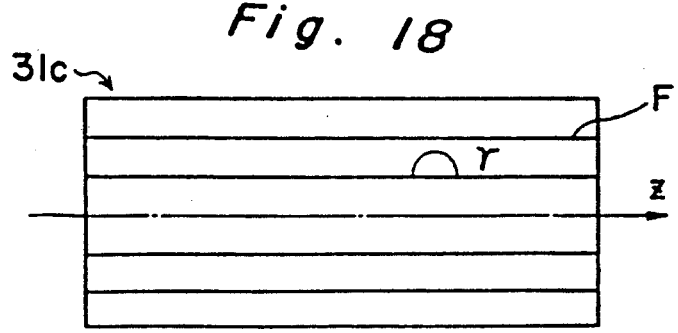

In the other parts 31c than the parts 31a and 31b, namely, where $0° \leq \theta < 60°$, $120° \leq \theta < 240°$ and $300° \leq \theta < 360°$, an angle $\tau$ of all the fibers F is 180° to the geometric principal axis G, as shown in FIG. 18. The angle $\tau$ may be any value so long as $\tau$ is neither equal to $\alpha 3$, nor to $\beta 3$.

Since the angle of fibers to the geometric principal axis is changed in the circumferential direction of the pipe-shaped structural member 31 and moreover, the angle in a part is not the same as in the other part symmetric to it, the elastic principal axis is shifted from the geometric principal axis in this second modification. Therefore, the same effect can be achieved as in the first embodiment and first modification.

Figure 19:
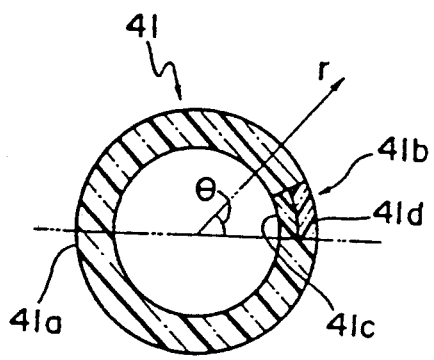
FIGS. 19 and 20 are cross sectional views of a third and a fourth modifications of the pipe-shaped structural member according to the first embodiment taken along the line I—I of FIG. 1, respectively.

With reference to FIG. 19, a pipe-shaped structural member 41 according to a third modification of the first embodiment has the same shape as in the first embodiment, which is obtained by laminating 12 prepreg sheets. An angle of the fibers in a part 41a where $30° \leq \theta < 360°$ in all the layers in the thicknesswise direction (a direction (r)) is 30° to the Z axis.

Meanwhile, the angle of fibers in part 41b of member 41 where $0° \leq \theta < 30°$ is changed in the thicknesswise direction ((r) direction). More specifically, in a part 41c where the first through fourth prepreg layers constitute an inside region of the pipe, the angle of the fibers is set to be 30° to the Z axis. In a part 41d where the fifth, through 12th prepreg sheets are laminated, the angle of the fibers is set to be $-30°$. However, the angle of the fibers is not restricted to the aforementioned values, and it may be enough that the angles are made different between parts 41c and 41d. Moreover, the angle can be changed in any layer.

As is described hereinabove, also in the third modification, the angle of fibers of the pipe-shaped structural member 41 is partially changed in the circumferential direction and the part where the angle of the fibers is made different is a part in the thicknesswise direction of the circumferential part. Accordingly, the elastic principal axis is shifted from the geometric principal axis, so that the same effect is obtained as in the first embodiment.

Figure 20:
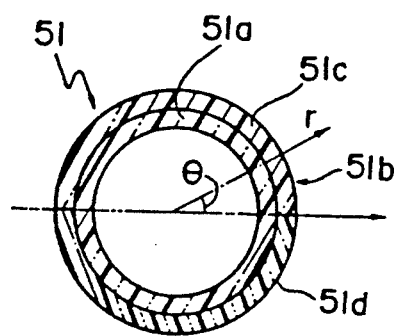

In a fourth modification shown in FIG. 20, a pipe-shaped structural member 51 is formed of laminated 12 prepreg sheets, having a different angle of the fibers in a thicknesswise direction thereof ((r) direction). Specifically, the angle of the fibers at a part 51a where the first through fifth sheets are laminated inside the region of member 51 is 60° to the Z axis (geometric principal axis) regardless of $\theta$. On the contrary, the angle of the fibers in part 51b where the sixth through 12th sheets are laminated is made different in the circumferential direction, that is, $-30°$ at a part 51c where $0° \leq \theta < 180°$ and 30° at a part 51d where $180° \leq \theta < 360°$.

The angle of fibers is not limited to the above-mentioned values, but may be any values which are different from each other. Moreover, the angle of fibers may be changed in any layer.

According to the fourth modification described above, since the angle of the fibers is made to be different, partially in the circumferential direction of the member 51 and the part where the angle of fibers is made to be different from the other part is at least a part in the thicknesswise direction of the circumferential part, the elastic principal axis is shifted from the geometric principal axis, thereby achieving the same effect as in the first embodiment.

(2) model made of fiber reinforced rubber only

Figure 21:
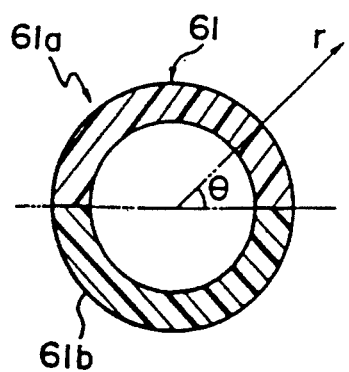
FIG. 21 is a cross sectional view of a structural member of a pipe shape according to a second embodiment of the present invention taken along the line I—I of FIG. 1.
Figure 22:
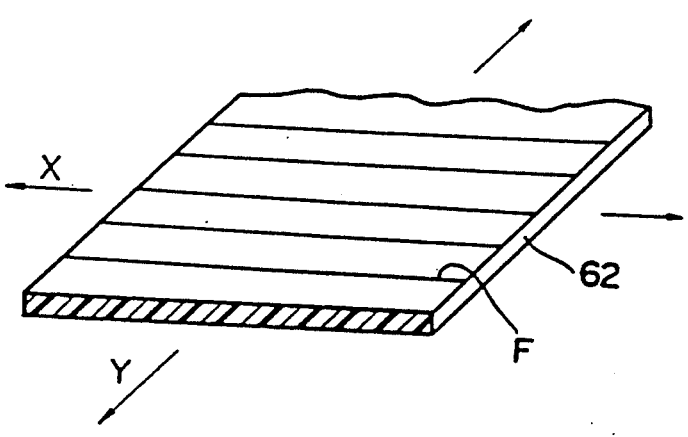
FIG. 22 is a perspective view of a rubber sheet made of fiber reinforced rubber.
Figure 23:
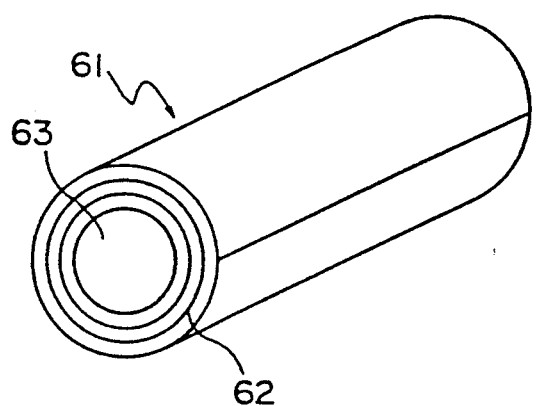
FIG. 23 is a perspective view of the rubber sheet when laminated on a mandrel.

Referring now to FIG. 21, a pipe-shaped structural member 61 according to a second embodiment of the present invention is made of fiber reinforced rubber only. The shape of the pipe member 61 is the same as that of the pipe made of FRP in the first embodiment. As is indicated in FIG. 22, the fiber reinforced rubber is in the state of a rubber sheet 62 containing fibers F, which has a high modulus of elasticity in a direction X parallel to the direction of fibers and a relatively low modulus of elasticity in a direction Y orthogonal to the X direction. Therefore, the fiber reinforced rubber possesses mechanical anisotropy. In comparison with the FRP described earlier, the fiber reinforced rubber is low in elasticity and rigidity, so that it can be deformed much more by a small force. In order to obtain the pipe-shaped structural member 61, as shown in FIG. 23, the rubber sheet 62 is divided into two in a circumferential direction of the member 61, laminated on a mandrel 63, wound with a cloth wrapping tape (not shown), pressured, vulcanized and formed into a pipe shape.

The structural member 61 of the second embodiment has the same angle of fibers in the first embodiment, i.e., 30° to the Z axis in a first part 61a where $0 \leq \theta < 180°$ irrespective of r and Z, and $-30°$ in a second part 61b where $180° \leq \theta < 360°$. The angle of fibers F is not restricted to the above values, and it is enough if the angle of fibers in the part 61a is different from that in part 61b. Further, the parts 61a and 61b may be defined in any different manner.

The operational characteristic of the pipe-shaped structural member of the second embodiment will be explained hereinbelow.

In the same manner as in the first embodiment and as illustrated in FIG. 5, one end of the pipe-shaped structural member 61 is rendered a fixed end 61c and the other end thereof is a free end 61d. When the tool 12 of FIG. 6 is inserted into a free end 61d of the structural member 61, with a weight 13 suspended from the tool 12, a load not passing a point on the elastic principal axis E is applied to the structural member 61 downwards As a result, the structural member 61 is deflected as indicated by the chain line in FIGS. 8 and 9.

As shown in FIG. 7, if the tool 15 is inserted into the free end of the structural member 61 and a weight is hung from the tool 15 so that a load passing the point Q on the elastic principal axis E is applied to the member 61 downwards, the structural member 61 is deflected, but not twisted as indicated by the chain line of FIGS. 10 and 11.

The pipe-shaped structural member 61 according to the second embodiment is formed of fiber reinforced rubber only, and therefore it can be greatly deformed utilizing with a relatively smaller load as compared with the structural member of the first embodiment (made of FRP only).

According to this second embodiment, similar to the examples made of FRP only in the first through fourth modifications of the first embodiment, it is possible to change the angle of the fibers and the parts where the angle of fibers is made different.

(3) model made of orientated rubber only

A pipe-shaped structural member according to the present invention is made of orientated rubber only. The shape of the pipe member is the same as those made of FRP and the fiber reinforced rubber in the first and second embodiments. For example, in the pipe-shaped structural member made of orientated rubber only, an orientation in a first part where $0° \leq \theta 180°$ is set at 30°, while an orientation in a second part where $180° \leq \theta < 360°$ is set at $-30°$.

The orientated rubber is high in elasticity and rigidity in the direction of orientation, but low in elasticity and rigidity in a direction orthogonal to the direction of orientation. According to the present embodiment, the orientated rubber is obtained by kneading a rubber composite containing 100 parts by weight of a basic rubber material, 3-100 parts by weight of $\alpha,\beta$-unsaturated fatty acid metallic salt and 0.5-5.0 parts by weight of an organic peroxide, and not containing other orientation applicators, adding a shearing stress in one direction, and then vulcanizing the same.

Particularly, the orientated rubber is obtained as follows. A rubber compound obtained by blending 65 parts by weight of basic zinc metacrylate as a metallic salt of $\alpha,\beta$-unsaturated fatty acid, 0.7 part by weight of an antioxidant and 1.0 part by weight of dicumil peroxide as an and 20 parts by weight of natural rubber is kneaded while it is applied with a shearing stress in a circumferential direction R by a pair of rolls. It is generally well known that a metallic salt of $\alpha,\beta$-unsaturated fatty acid is co-crosslinked with a rubber, thereby realizing high rigidity and high durability. When the rubber compound 6 is kneaded with the shearing stress added, crystals of the basic zinc metacrylate are orientated in a direction F which is the same as the above circumferential direction R (This fact is confirmed through X-ray radiation by the present inventors.).

Then, if the rubber compound is vulcanized in a mold, it is turned out to be a rubber having dynamic anisotropy, more specifically, having extreme strength and small elongation in the orientating direction F of the basic zinc metacrylate (high rigidity, high modulus of elasticity and small breaking elongation), with not very high strength and a large elongation in a direction different from the orientating direction, particularly, defining 90° from the orientating direction (low rigidity, low modulus of elasticity and large breaking elongation).

The rubber compound is not necessarily kneaded by a roll, but may be done by an extruder. In this case, the orientating direction coincides with the extruding direction.

When a sheet of the rubber compound obtained in the above-described manner is set in a mold by a mandrel, and vulcanized for 30 minutes at 160 ° C., the pipe-shaped structural member in the form divided in half in the circumferential direction thereof is formed.

In the present embodiment, the basic rubber, rubber compound and composition thereof are not restricted to the above, and it is enough that 100 parts by weight of the basic rubber, 3-100 parts by weight of a metallic salt of $\alpha,\beta$-unsaturated fatty acid and 0.5-5.0 parts by weight of an organic peroxide are included.

By way of example, any component in the conventional rubber compound may be used for the basic rubber, but styrene-butadiene rubber, EPDM, natural rubber or the like is generally used besides the above-mentioned polybutadiene rubber. Particularly suitable for the basic rubber is cis-1,4-polybutadiene having 90% or more of the cis form.

Moreover, a metallic salt of $\alpha,\beta$-unsaturated carboxylic acid containing 3-8 carbons is suitable for the metallic salt of $\alpha,\beta$-unsaturated fatty acid orientated in a direction of grain effect of the rubber when the rubber compound is kneaded, e.g., metallic salt of acrylic acid, itaconic acid, crotonic acid, etc. as well as the metacrylic acid may be employed. Although it is general to use a dihydric metal, preferably, zinc, magnesium or the like, the other metals such as sodium, lithium, etc. may be employed. The metallic salt of $\alpha,\beta$-unsaturated fatty acid is blended utilizing 3-100 parts by weight, preferably 10-70 parts by weight for 100 parts by weight of the basic rubber. If the metallic salt is blended utilizing 3 parts by weight or less, the anisotropy in strength cannot be gained, making it impossible to achieve the required effects. On the other hand, if the metallic salt is blended by 100 parts by weight or more, the compound gets hard, thereby deteriorating the working efficiency and moldability.

As for the organic peroxide, perbenzoic acid, benzoyl peroxide, cumene peroxide, etc., may be used, but the above-mentioned di-cumil peroxide is preferable. The amount of the organic peroxide blended with 100 parts by weight of the basic rubber is 0.5-5.0 parts by weight. If the organic peroxide is not more than 0.5 parts by weight, the metallic salt of $\alpha,\beta$-unsaturated fatty acid is hard to crosslink, while, if the organic peroxide is blended by 5.0 parts by weight or more, the mold becomes fragile and not fit for the practical use. Therefore, it is desirable that the organic peroxide is blended utilizing 1.0-3.0 parts by weight per 100 parts by weight of the basic rubber.

The pipe-shaped structural member made of orientated rubber can be greatly deformed large with a relatively smaller load as compared with the structural member of the first embodimemt (made of FRP only).

According to the pipe-shaped structural member made of orientated rubber, similar to the examples made of FRP only in the first through fourth modifications of the first embodiment, it is possible to change the angle of orientation instead of the angle of fibers and the parts where the angle of orientation is made different.

Figure 24:
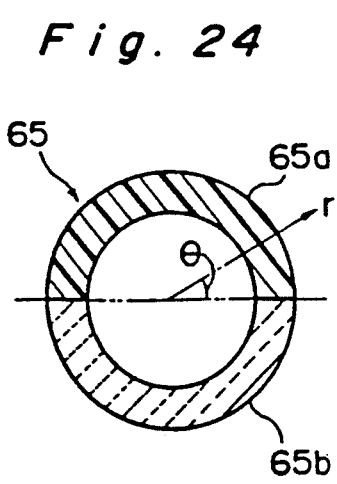
FIG. 24 is a cross sectional view of a structural member of a pipe shape according to a third embodiment of the present invention taken along the line I—I of FIG. 1.
Figure 25:
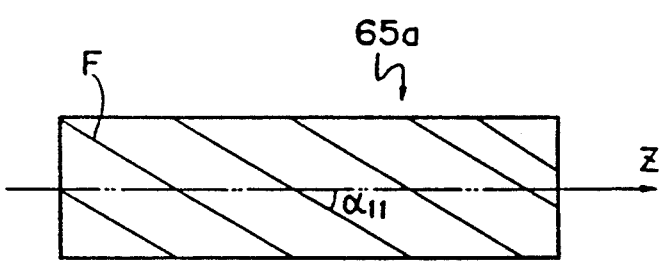
FIGS. 25 and 26 are schematic views showing the angle of fibers and direction of orientation of the pipe-shaped structural member of the third embodiment.
Figure 26:
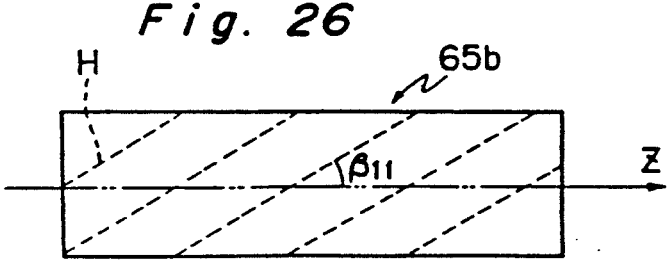

2) model composed of two kinds of anisotropic materials (1) model made of fiber reinforced rubber and orientated rubber A pipe-shaped structural member according to a third embodiment is shown, in FIGS. 24 through 26, wherein an angle α11 of fibers in a first part 65a where $0°≦θ<180°$ is set 30° as shown in FIG. 25, while an angle β11 defined by the direction of orientation H to the Z axis at a second part 65b where $180°≦θ<360°$ is set to −30°. The part 65a of the pipe-shaped structural member is formed of fiber reinforced rubber and the part 65b is formed of orientated rubber.

The pipe-shaped structural member 65 is manufactured in the same manner as illustrated in FIG. 23. Each sheet of fiber reinforced rubber and orientated rubber is laminated on the mandrel, set in a mold, vulcanized and formed into a pipe-shaped structural member.

The pipe-shaped structural member 65 of the third embodiment twists when it is bent and bends when it is twisted, representing a specific movement of deformation.

Figure 27:
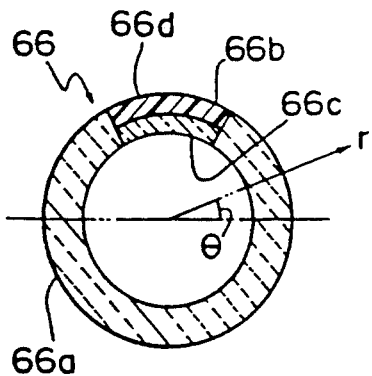
FIG. 27 is a cross sectional view of a modification of the pipe-shaped structural member according to the third embodiment taken along the line I—I of FIG. 1.

FIG. 27 shows a modification of the third embodiment. A modified pipe-shaped structural member 66 is formed by laminating five rubber sheets. Concretely, at parts 66a where $0°≦θ<60°$ and $120θ<360°$, the direction of orientation is maintained 30° and the orientated rubber sheets are laminated from the first through fifth layers. On the other hand, at part 66b where $60≦θ<120°$, particularly, at part 66c having the direction of orientation 30°, the orientated rubber sheets are provided from the first to second layers, and at a part 66d having the angle of fibers to the geometric principal axis −30°, the fiber reinforced rubber is laminated from the third to fifth layers.

This modification of the third embodiment acts in the same peculiar manner as the member of the first embodiment.

Even when the pipe-shaped structural member is formed of a combination of the fiber reinforced rubber and orientated rubber, the angle of fibers of the fiber reinforced rubber or the direction of orientation of the orientated rubber may be variously changed. At the same time, the parts where the angle of fibers or the direction of orientation is changed may be determined in any different manner as in the first through fourth modifications of the first embodiment.

(2) model made of FRP and fiber reinforced rubber

Figure 28:
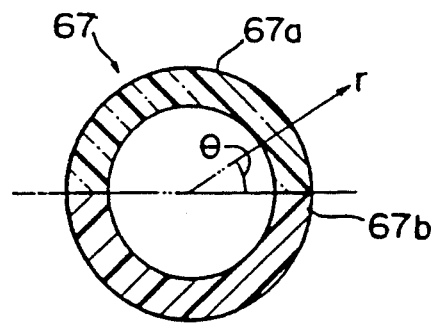
FIGS. 28 and 29 are cross sectional views of a structural member of a pipe shape according to a fourth embodiment of the present invention and a modification thereof taken along the line I—I of FIG. 1.

A pipe-shaped structural member 67 of FIG. 28 according to a fourth embodiment of the present invention has a first part 67a where $0°≦θ<180°$ formed of FRP and a second part 67b where $180°≦θ<360°$ formed of fiber reinforced rubber. The angle of fibers in part 67a is set in 30° and that in part 67b is −30°.

The pipe-shaped structural member 67 of the fourth embodiment also behaves in a peculiar style like the structural member of the first embodiment.

Figure 29:
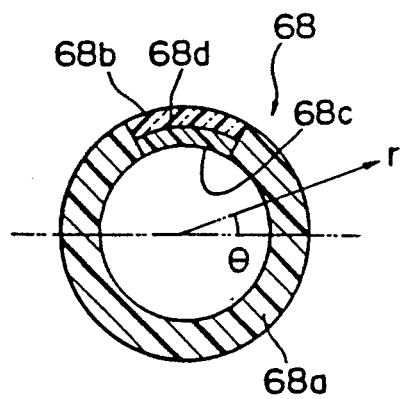

FIG. 29 shows a modification of the fourth embodiment This modified example 68 has parts 68a where $0°≦θ<60°$ and $120°≦θ<360°$ formed of fiber reinforced rubber with the angle of fibers being 30°, regardless of r. Meanwhile, at a part 68b where $60°≦θ<120°$, a sheet of fiber reinforced rubber with the angle of fibers being 30° is provided at an inner side, whereas an outer side 68d is composed of FRP with the angle of fibers being −30°.

(3) model made of FRP and orientated rubber

Figure 30:
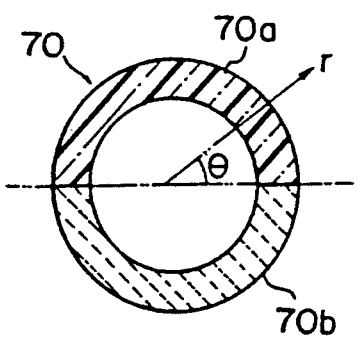
FIGS. 30 and 31 are cross sectional views of a structural member of a pipe shape according to a fifth and a sixth embodiments of the present invention taken along the line I—I of FIG. 1, respectively.

In FIG. 30, there is shown a pipe-shaped structural member 70 according to a fifth embodiment of the present invention. A first part 70a of the structural member 70 where $0°≦θ<180°$ is formed of FRP with the angle of fibers being 30° and a second part 70b where $180°≦θ<360°$, is formed of orientated rubber with the direction of orientation being −30°.

The pipe-shaped structural member of this fifth embodiment acts in the same peculiar fashion as that of the first embodiment.

It should be noted that the angle of the fibers or the direction of orientation may be variously changed, and the method where the angle of fibers or direction of orientation is changed can be changed similar to the first embodiment.

Figure 31:
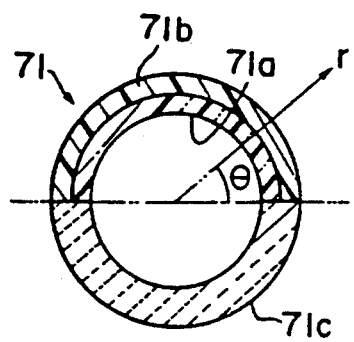

3) model made of three kinds of anisotropic materials, i.e., FRP, fiber reinforced rubber and orientated rubber Referring to FIG. 31, a pipe-shaped structural member 71 according to a sixth embodiment of the present invention is formed to 10 laminated sheets. A part 71a from the first to fifth layers at an inner region of the member where $0°≦θ<180°$ is made of FRP with the angle of fibers being 30°. A part 71b from the sixth to tenth layers at an outer region where $0°≦θ<180°$ is formed of fiber reinforced rubber with the angle of fibers being 30°, and a part 71c from the first to tenth layers where $0⅟≦θ<360°$ is formed of orientated rubber with the direction of orientation being −30°.

According to the sixth embodiment, the pipe-shaped structural member shows a peculiar style of behavior in the similar manner as in the first embodiment.

It is possible also in the sixth embodiment to change the angle of the fibers or the direction of orientation in various ways.

Figure 32:
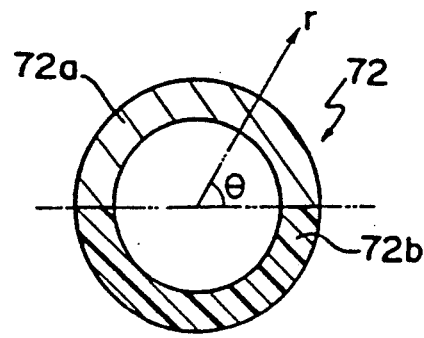
FIGS. 32 and 33 are cross sectional views of a structural member of a pipe shape according to a seventh embodiment of the present invention and a modification thereof taken along the line I—I of FIG. 1, respectively.
Figure 33:
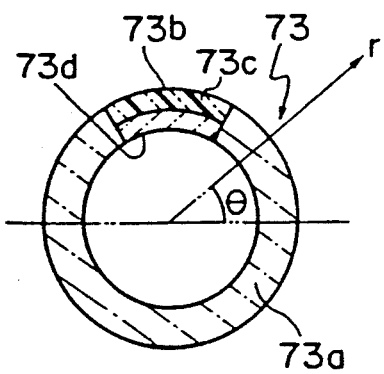

4) model composed of anisotropic and isotropic materials of the same kind (1) model made of a combination of FRP and isotropic resin not containing reinforcing fibers A pipe-shaped structural member 72 according to a seventh embodiment of the present invention is shown in FIG. 32. A first part 72a of the member 72 where $0°≦θ<180°$ is formed of a general isotropic resin not containing fibers and not having mechanical anisotropy. On the other hand, a second part 72b of the member 72 where $180°≦θ<360°$ is formed of FRP with the angle of fibers set at 30°.

Moreover, a modified example 73 of the seventh embodiment has parts 73a where $0°≦θ<60°$ and $120°≦θ<360°$ which are formed of a resin not containing fibers. On the other hand, a part 73c at an outer region of a part 73b where $60°≦θ<120°$ is formed of FRP having a fiber angle of 30° and the other part 73d of the part 73b other than part 73c is formed of a resin not containing fibers.

Both the structural member 72 of the seventh embodiment and the structural member 73 of the modified example act in a peculiar fashion.

Figure 34:
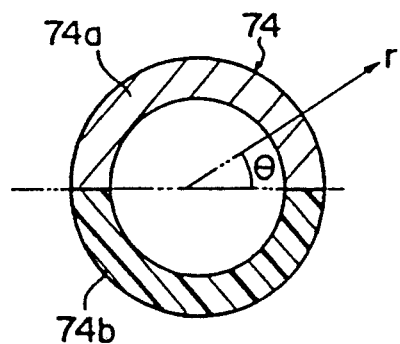
FIGS. 34 through 37 are cross sectional views of a structural member of a pipe shape according to an eighth through an eleventh embodiments of the present invention taken along the line I—I of FIG. 1, respectively.

(2) model made of a combination of fiber reinforced rubber and isotropic rubber not containing fibers A pipe-shaped structural member 74 according to an eighth embodiment of the present invention is, as shown in FIG. 34, a first part 74a where $0°≦θ<180°$; which is formed of a general rubber without having mechanical anisotropy and, a second part 74b where $1800°≦θ<360°$; which is formed of fiber reinforced rubber with the fiber angle being 30°.

Figure 35:
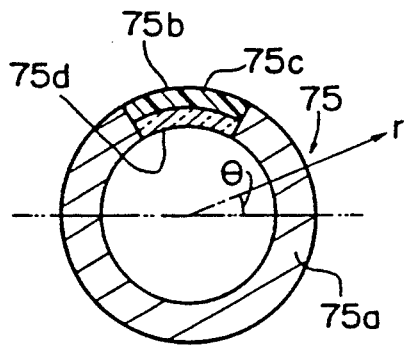

(3) model made of a combination of fiber reinforced rubber, orientated rubber and isotropic rubber In a pipe-shaped structural member 75 according to a ninth embodiment of the present invention shown in FIG. 35, parts 75a where $0° \leq \theta < 60°$ and $120° \leq \theta < 360°$ are formed of a general rubber not having mechanical anisotropy. Meanwhile, a part 75c at an outer region of a part 75b where $60° \leq \theta < 120°$ is formed of a fiber reinforced rubber having a fiber angle of 30°, and the other part 75d of the part 75b is formed of an orientated rubber with the direction of orientation of 30°.

Similar to the first embodiment, each pipe-shaped structural member of the eighth and ninth embodiments moves in a peculiar manner.

It is noted that the angle of the fibers and the direction of orientation of the anisotropic material may be variously changed in any of the foregoing models (1), (2) and (3), and moreover the position or arrangement of parts where the angle of the fibers is made different is not restricted to that described above.

Figure 36:
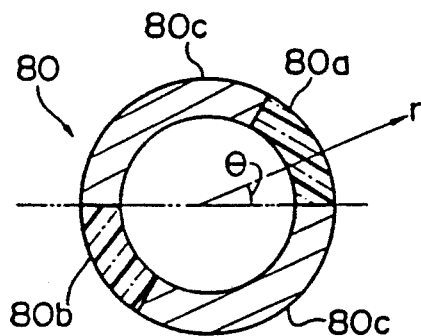

5) model composed of a combination of anisotropic and isotropic materials of different kinds (1) model made of a combination of FRP and isotropic rubber not containing fibers FIG. 36 shows a pipe-shaped structural member 80 according to a tenth embodiment of the present invention. A part 80a of the member 80 where $0° \leq \theta < 60°$ is made of FRP having a fiber angle of 30°, a part 80b where $180° \leq \theta < 240°$ is formed of FRP having a fiber angle of $-30°$, and the other parts 80c where $60° \leq \theta < 180°$ and $240° \leq \theta < 360°$ are formed of a rubber not having mechanical anisotropy.

Figure 37:
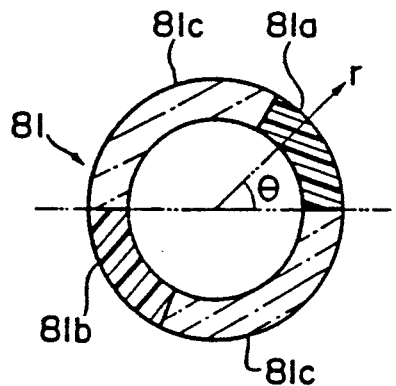

(2) model made of a combination of fiber reinforced rubber and isotropic resin not containing fibers According to an eleventh embodiment of the present invention, as indicated in FIG. 37, a part 81a of a pipe-shaped structural member 81 where $0° \leq \theta < 60°$ is made of fiber reinforced rubber having a fiber angle of 30°. A part 81b where $180° \leq \theta < 240°$ is made of fiber reinforced rubber having a fiber angle of $-30°$. The other parts 81c where $60° \leq \theta < 180°$ and $240° \leq \theta < 360°$ are formed of resin not having mechanical anisotropy.

A description of the other combinations other than the foregoings (1) and (2) will be abbreviated here.

In the above examples where the structural member is composed of a combination of anisotropic and isotropic materials of different kinds, the angle of the fibers and/or the direction of orientation are partially changed in the circumferential direction of the structural member, and at the same time, the parts where the angle of the fibers and/or the direction of orientation is made different are at least a part in the thicknesswise direction and moreover symmetric to each other to the geometric principal axis of the structural member. Accordingly, the same style of peculiar behavior is realized as obtained by the first embodiment.

Experiments

The amount of deformation of the pipe-shaped structural member according to the present invention is measured when it is bent, so that the mechanical property of the structural member is tested.

The experiments are conducted for each pipe-shaped structural member of the first and second embodiments As for the first embodiment, 12 prepreg sheets are laminated so that the angle α1 of all fibers to the geometric principal axis at the first part 11a is 20°, 30° or 50°, and the angle β1 at the second part 11b is $-20°$, $-30°$ or $-50°$, thereby constituting the structural member 11. Three structural members are prepared for the experiments A length L of the member is set at 450 mm, an inner diameter $\phi 1$ is 16 mm and an outer diameter $\phi 2$ is 19 mm.

As for the second embodiment, 12 rubber sheets, each 0.85 mm thick, are laminated so that the direction of all fibers to the geometric principal axis at the first part 61a of FIG. 21 is 20° or 30°, and the angle of the fibers at the other second part 61b is $-20°$ or $-30°$, respectively. The laminated rubber sheets are vulcanized in a vulcanizer at 140° C. for one hour, whereby a pipe-shaped structural member having a length L 400 mm, an inner diameter $\phi 1$ 16 mm and an outer diameter $\phi 2$ 36 mm is obtained. Two structural members are tested.

Figure 38:
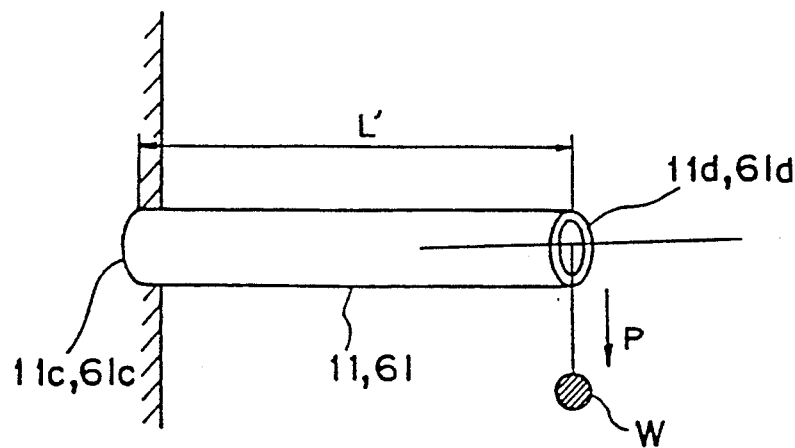
FIG. 38 is a schematic view showing an apparatus for testing the pipe-shaped structural member of the present invention.

The testing method is as shown in FIG. 38. One end of each of the pipe-shaped structural members 11 and 61 is tightly fixed by a chuck, so that the one end is a fixed end 11c or 61c. The other end of the member 11 or 61 is a free end 11d or 61d. The pipe-shaped structural member 11 according to the first embodiment projects a distance L' or 400 mm from the fixed end 11c, while the pipe-shaped structural member 61 of the second embodiment projects a distance L'=350 mm from the fixed end 61c. A load P=2.7 kg or 6.3kg is applied to a crossing point of the free end 11d with the geometric principal axis G by a weight W in a vertical direction with the use of the tool 12 of FIG. 6. On the other hand, for the structural member 61 made of fiber reinforced rubber alone, a load P=0.5 kg or 1.0 kg is applied to the crossing point of the free end 61d with the geometric principal axis G in the same manner as above. The amount of deflection and the angle of distortion are calculated by the displacement in the vertical direction of a front end of an indicating needle 14 provided horizontally at the free end 11d or 61d.

The result of the experiments is tabulated in Tables 1 and 2, respectively for the case of the pipe-shaped structural member 11 formed of FRP only according to the first embodiment and for the case of a pipe-shaped structural member 61 formed of fiber reinforced rubber only, according to the second embodiment.

TABLE 1

| Angle of orien-tation (°) | Load (kg) | | | | Deviation of elastic principal axis (mm) |
|---|---|---|---|---|---|
| | 2.7 | | 6.3 | | |
| | Defl'tion (mm) | Dis'tion (°) | Defl'tion (mm) | Dis'tion (°) | |
| 20 | 5.8 | 1.0 | 14.4 | 2.7 | 68.6 |
| 30 | 10.6 | 1.4 | 24.2 | 3.6 | 92.4 |
| 50 | 16.7 | 1.1 | | | 102.6 |

TABLE 2

| Angle of orien-tation (°) | Load (kg) | | | | Deviation of elastic principal axis (mm) |
|---|---|---|---|---|---|
| | 0.5 | | 1.0 | | |
| | Defl'tion (mm) | Dis'tion (°) | Defl'tion (mm) | Dis'tion (°) | |
| 20 | 18 | 5.2 | 39 | 11.7 | 94 |
| 30 | 40 | 7.2 | 81 | 13.9 | 157 |

As is apparent from the above Tables 1 and 2, both deflection and distortion(twist) can be recognized in any of the structural members of the first and second embodiments although only a bending moment is applied to the members.

Furthermore, the deviation ε of the elastic principal axis E to the geometric principal axis G (indicated in FIG. 39) results as indicated in Tables 1 and 2 depending on the angle of orientation of the fibers.

Accordingly, it is clear that if the angle of the fibers is controlled, the amount of deflection, angle of distortion and deviation of the elastic principal axis can be adjusted.

When the amount of deflection and angle of distortion are compared between Tables 1 and 2, the pipe-shaped structural member made of fiber reinforced rubber is deformed more with a small load than the pipe-shaped structural member made of FRP.

Figure 40:
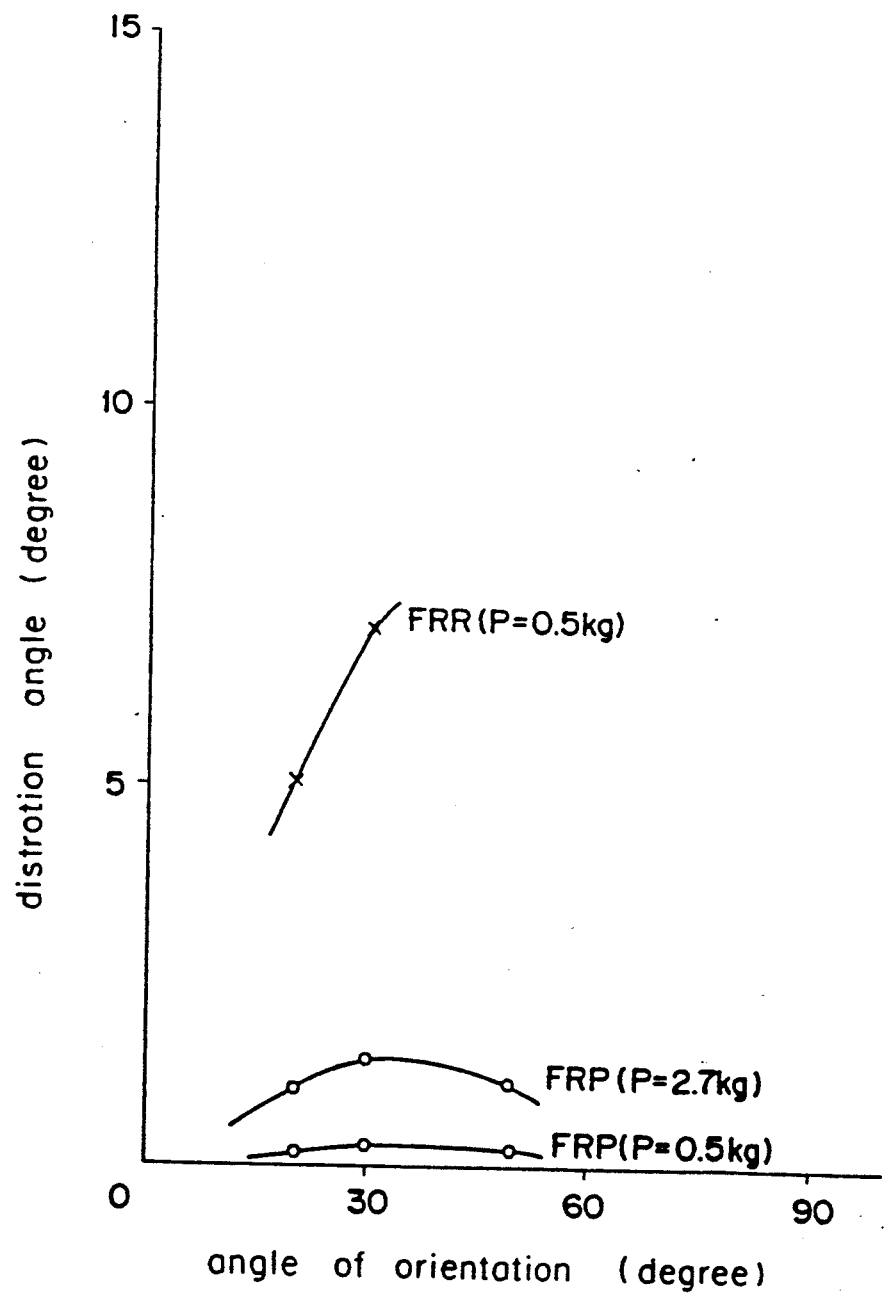
FIGS. 40 and 41 are graphs showing the relation between the angle of orientation and distortion angle and that between the angle of orientation and amount of deflection, respectively.
Figure 41:
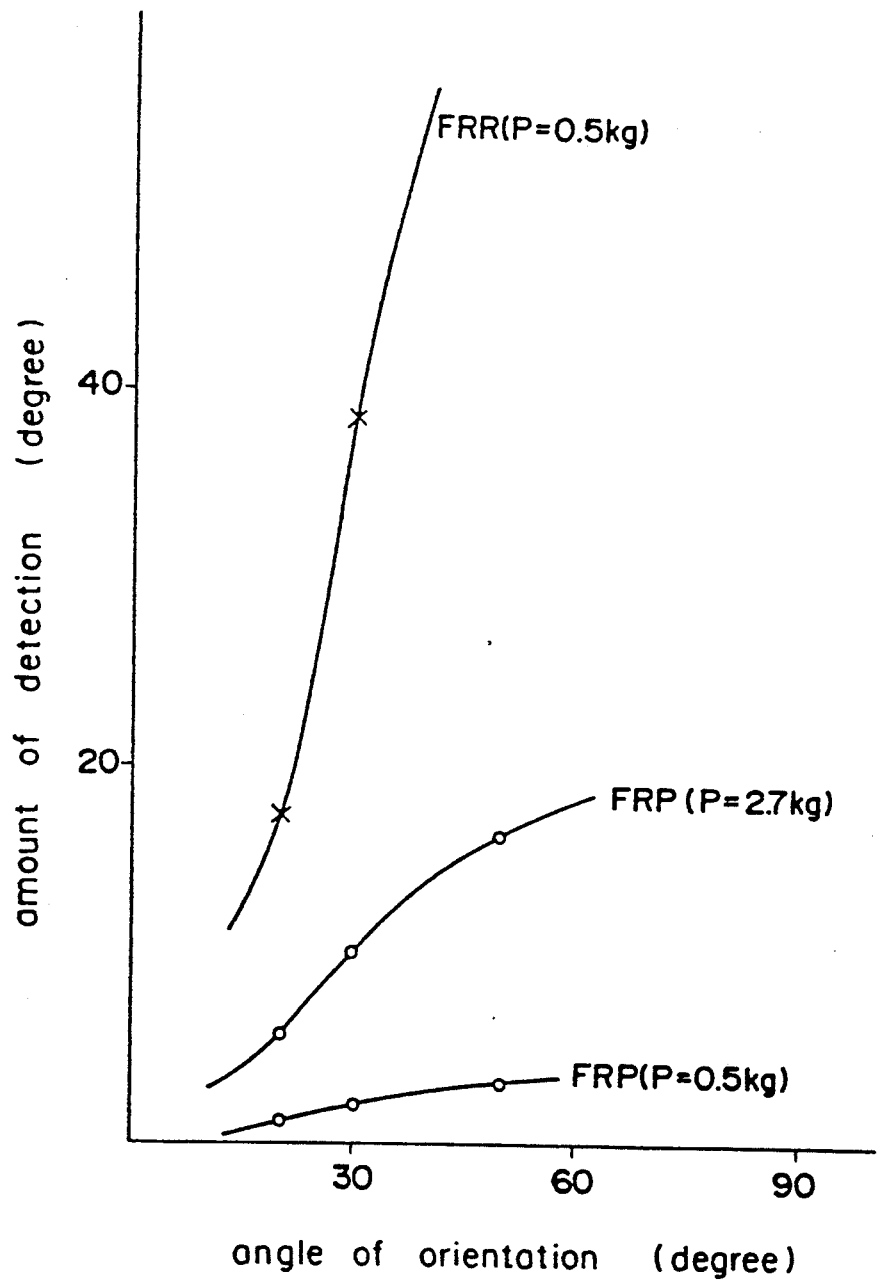

Presuming that the same load (P=0.5 kg or 2.7 kg) is applied to the pipe-shaped structural members 11 made of FRP (distance L' from the fixed end to the free end=400 mm, inner diameter $\phi 1=16$ mm, and outer diameter $\phi 2=19$ mm) and 61 made of fiber reinforced rubber (FRR) (distance L' from the fixed end to the free end=350 mm, inner diameter $\phi 1=16$ mm and outer diameter $\phi 2=36$ mm), the relationship between the angle of orientation and angle of distortion and between the angle of orientation and amount of deflection are indicated in graphs of FIGS. 40 and 41.

The thickness of the pipe-shaped structural members 11 and 61 is 1.5 mm and 10 mm, respectively. Although the member 61 of the fiber reinforced rubber is as thick as 6.6 times the member 11 of FRP, the structural member 61 shows much larger distortion and deflection than the member 11 even when the former is applied with a load P=0.5 kg and the latter is applied with a load P=2.7 kg, that is, the former is applied with the load about 1/5 that of the latter. Therefore, the structural member 61 made of fiber reinforced rubber only is easily deformed as compared with the member 11 made of FRP alone.

As is described hereinabove, the pipe-shaped structural member embodied the present invention is so constituted that the angel of the fibers and/or the direction of orientation of the fibers are made partially different in the circumferential direction of the member, and the part where the angle of fibers and/or direction of orientation are made different is at least a part of the member in the thicknesswise direction of the circumferential part. For example, the angle of the fibers in symmetric parts, which are the first part and the second part to the geometric principal axis is made different from each other, or the above-noted parts where the angle of the fibers and/or direction of orientation are made different, is formed of an orientated material, while the other part is formed of a material not having anisotropy. Therefore, a deviation is produced between the geometric principal axis and elastic principal axis of the structural member. When one end of the structural member is fixed, with the other end being free, if a load not passing a point on the elastic principal axis is applied to the member, the member deflects and twists On the other hand, however, when a load passing a point on the elastic principal axis is applied to the member, the member deflects, without twisting. Accordingly, the structural member of the present invention is designed to behave in such a peculiar style of movement as above.

Moreover, if the angle of the fibers to the geometric principal axis is changed, or the parts having the same angle of fibers to the geometric principal axis are defined in a different manner in the circumferential direction, the amount of deviation of the elastic principal axis to the geometric principal axis is easily changed. In consequence, the pipe-shaped structural member according to the present invention is applicable to a wide range of industrial fields utilizing the peculiar style of behavior thereof resulting from the mechanical property of the anisotropic material reinforced by the fibers.

The following description is related to the other embodiments of the pipe-shaped structural member of the present invention used for a golf club shaft.

A golf club shaft 120 shown in FIGS. 42 through 46 is made of FRP only (epoxy composite material reinforced by carbon fibers), and is manufactured through lamination of prepreg sheets as will be described later.

The golf club shaft 120 has the total length L 1200 mm, with an outer diameter OD1 of 5.6 mm and an inner diameter ID1 of 12.6 mm at an edge 120a where the a grip 130 shown in FIG. 47 is attached An outer diameter and inner diameter from the edge 120a to l1=200 mm are set equal to each other, defining an installation part 120c of the grip. The part having a length l2=1000 mm from the end of the installation part 120c to a front edge 120b of the golf club shaft where a club head 140 is mounted, is tapered. An outer diameter OD2 is 7.5 mm and an inner diameter ID2 is 4.5 mm at this part.

The grip 130 is securely fit outside the installation part 120c. At the other end of the shaft 120, there is mounted the iron club head 140 as indicated in FIGS. 47 and 48.

The center of gravity A of the weight of the club head 140 is separated a distance l3=34 mm from the geometric principal axis G of the shaft 120. The position of the center of gravity A of the club head 140 is determined by the shape and weight apportionment thereof.

On the other hand, the geometric center of gravity B of a scoring area 150 in a trapezoidal shape in a face 140a of the club head 140 is separated a distance l4=37 mm from the geometric principal axis G when the head 140 is mounted in the club shaft 120. The scoring area 150 is marked by oblique lines. The position of the geometric center of gravity B is determined depending on the shape of the scoring area 150.

The material, angle of fibers and parts where the angle of fibers is changed are so set in the golf club shaft 120 of the present embodiment that the elastic principal axis E2 passes the center of gravity A of the club head 140. In other words, regardless of Z, at a first part 120d where $0° \leq \theta < 180°$, an angle of fibers $\alpha 12$ is set to be 6° and, at a second part 120e where $180° \leq \theta < 360°$, an angle of fibers $\beta 12$ is set to be $-6°$. 12 prepreg sheets are laminated in each Prepreg sheets of a length one-half the circumference of the pipe which are cut to have the angle of fibers $\alpha 12$ and prepreg sheets of a length one-half the circumference of the pipe which are cut to have the angle of fibers $\beta 12$ are sequentially laminated respectively at the parts 120d and 120e, wound with a wrapping tape, pressurized and cured in an oven. Thus, the golf club shaft 120 is obtained.

Since the angle of fibers to the geometric principal axis is made different partially in the circumferential direction of the golf club shaft 120, the elastic principal axis E2 deviates from the geometric principal axis G.

When a part of the golf club shaft 120 which is 200 mm away from the edge 120a is rendered a fixed end, and the golf club shaft 120 is cantilevered to have the length l2=1000 mm, with the grip installation part 120c being fixed as indicated in FIG. 49, a deviation l5 between the elastic principal axis E2 and the geometric principal axis G is so arranged as to be 35.7 mm at the end of the shaft that the elastic principal axis E2 vertical to the face 140a of the club head 140 passes the center of gravity A of the club head 140 and a point Q.

In the case where the elastic principal axis is shifted from the geometric principal axis as above, if the club shaft is bent and twisted while it is added with a load on the elastic principal axis, the club shaft does deflect, but never twists as mentioned earlier.

Accordingly, in the golf club shaft 120 of the present invention, since the elastic principal axis E2 vertical to the face 140a of the club head 140 is made coincident with the center of gravity A of the club head 140 while the grip 130 is fixed, and the elastic principal axis passes the center of gravity A, even when the golf club shaft is applied with a bending and twisting moment when the player swings, only a deflection is generated at the end of the shaft 120. The club shaft 120 is never twisted. Accordingly, the face 140a of the club head 140 is prevented from being rotated to the club shaft 120, allowing the player to turn the face 140a correctly to the golf ball.

Figure 50:
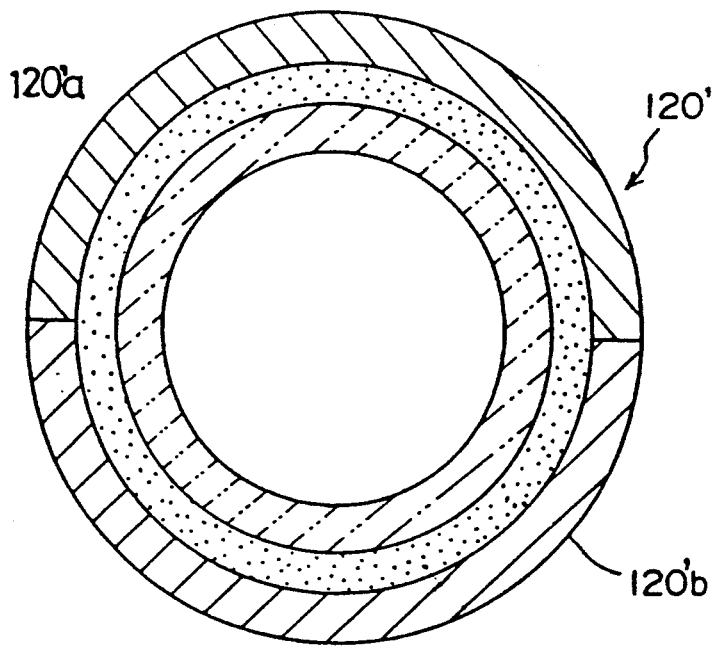
FIG. 50 is a cross sectional view of a golf club shaft according to another embodiment of the present invention.

FIG. 50 indicates a golf club shaft 120' according to a different embodiment of the present invention. At the first part 120'a of the shaft 120' where $0° \leq \theta < 180°$, three pairs of prepreg sheets are laminated, in which each pair consists of two sheets and one of the pair has a fiber angle $\alpha 13$ of 45° and the other has an angle of fibers $\alpha 14$ of −45°. Subsequently, three prepreg sheets each having a fiber angle $\alpha 15$ of 0° and three prepreg sheets each having a fiber angle $\alpha 16$ of 25° are laminated from the inner side to the outer side of the shaft.

On the other hand, at the second part 120'b where $180° \leq \theta < 360°$, three pairs of prepreg sheets in which each pair consists of two sheets and one of the pair has an angle of fibers $\beta 13 = 45°$ and the other has an angle of fibers $\beta 14 = -45°$, three sheets having a fiber angle $\beta 15 = 0°$ and three sheets having a fiber angle $\beta 16 = 25°$ are sequentially laminated from the inner side to outer side of the shaft.

Since the angle of the fibers of a part of the circumferential direction of the golf club shaft 120' is made different from that in the other parts, the elastic principal axis E3 vertical to the face 140a is arranged to pass the geometric center of gravity B of the scoring area 150 as shown in FIG. 49.

The elastic principal axis E3 is set as above, and accordingly the golf club shaft 120' is not twisted by the repulsion from a golf ball when the player hits the golf ball. The face 140a of the club head 140 is not rotated to the geometric principal axis G of the shaft 120', therefore making it possible for the player to drive the golf ball in a straight direction.

It is noted here that a golf club shaft mounted with a wood club head is formed in the same manner as a golf club shaft mounted with an iron club head, and accordingly it moves in the same manner as the golf club shaft mounted with the iron club head.

<<Experiments>>

It is confirmed through the following experiments that the elastic principal axis of the golf club shaft according to the present invention can be set at a desired position.

TABLE 3

| | | Constitution of lamination in each experimental shaft | | | |
|---|---|---|---|---|---|
| | | Constitution of lamination (orientating direction of fibers, number of laminations) Circumferential position | | | |
| | | $0 \leq \theta < 180$ | | $180 \leq \theta < 360$ | |
| Comparative example | Inside | 45° / −45° | 3 layers | 45° / −45° | 3 layers |
| | Outside | 0° | 6 layers | 0° | 6 layers |
| Experimental shaft 1 | | 6° | 12 layers | −6° | 12 layers |
| Experimental shaft 2 | Inside | 0° | 9 layers | 0° | 4 layers |
| | Outside | 50° | 8 layers | −50° | 8 layers |
| Experimental shaft 3 | Inside | 35° / −35° | 5 layers | 35° / −35° | 5 layers |
| | Outside | 15° | 2 layers | −15° | 2 layers |
| Experimental shaft 4 | Inside | 0° | 4 layers | 0° | 4 layers |
| | Outside | 45° | 8 layers*1 | −45° | 8 layers*1 |
| Experimental shaft 5 | Inside | 45° / −45° | 3 layers | 45° / −45° | 3 layers |
| | | 0° | 4 layers | 0° | 4 layers |
| | Outside | 30° | 2 layers | −30° | 2 layers |
| Experimental shaft 6 | Inside | 45° / −45° | 3 layers | 45° / −45° | 3 layers |
| | | 0° | 4 layers | 0° | 4 layers |
| | Outside | 38° | 2 layers | −38° | 2 layers |
| Experimental shaft 7 | Inside | 45° / −45° | 3 layers | 45° / −45° | 3 layers |
| | | 0° | 3 layers | 0° | 3 layers |
| | Outside | 25° | 3 layers | −25° | 3 layers |

N.B.: 45° / −45° represents that one layer having an angle of fibers 45° and one layer having an angle of fibers −45° are combined to be one layer.

The experiments are conducted for seven kinds of golf club shafts having the lamination construction as tabulated in Table 3 above and one comparative golf club shaft wherein the elastic principal axis is made coincident with the geometric principal axis. Eight golf club shafts in total are presented for the experiments.

The characteristics of the seven kinds of the golf club shafts are depicted hereinbelow.

<Experimental shaft 1>

This shaft has a fiber angle in the thicknesswise direction (r direction) which is constant. The layers are laminated asymmetrically.

<Experimental shafts 2 and 3>

A pair of prepreg sheets made of anisotropic material are laminated symmetrically at the inner side of the shaft or symmetric layers having a fiber angle of 0° are provided at the inner region, and asymmetric layers are provided at the outer region of the shaft.

<<Experimental Shaft 4>>

The shaft is formed in the same construction as the experimental shafts 2 and 3. Two kinds of materials are used.

<<Experimental shafts 5, 6 and 7>>

The experimental shaft 7 has symmetric layers made of a combination of layers having a fiber angle ±45° and layers having a fiber angle 0° at the inner region, with asymmetric layers at the outer region.

The position of the elastic principal axis at the end of the shaft is changed by the constitution of the lamination in respective shafts 1 through 7.

The material of all the shafts except the outer layers of the experimental shaft 4 (indicated by * in Table 3) is carbon fiber reinforced epoxy resin. The outer layers of the experimental shaft 4 are made of boron fiber reinforced epoxy resin.

For experiments, the shaft is projected 1000 mm while the grip 130 thereof is fixed as indicated in FIG. 49. Then, a weight of 2.0 kg is added by the tool 12 of FIG. 6 and tool 15 of FIG. 7 to a point 0 mm, 20 mm, 30 mm or 50 mm from the geometric principal axis G at the free end of the shaft.

Figure 51:
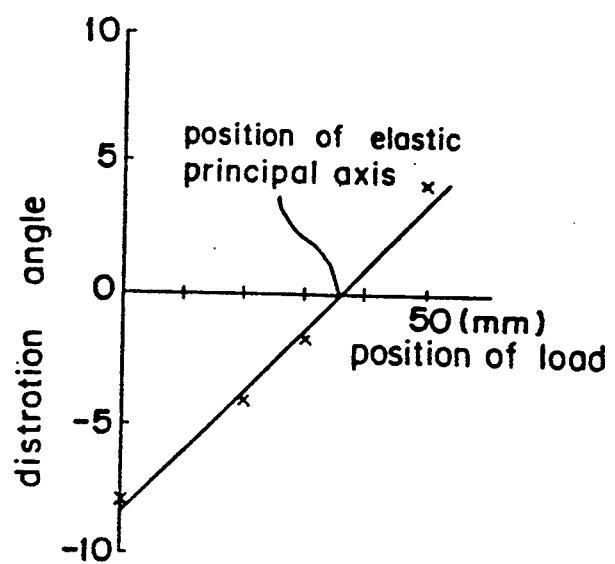
FIG. 51 is a graph showing the result of experiments using the golf club shaft of FIG. 42.

The results of the experiments are tabulated in Table 4 below. Moreover, the graph of FIG. 51, representing the results of the experiments conducted on experimental shaft 1 shows that the position of the elastic principal axis at the free end of the experimental shaft 1 is shifted 35.7 mm. The position of the elastic principal axis of each of the other experimental shafts is also shifted as shown in Table 5 below.

TABLE 4

| | Result of experiments | | | |
|---|---|---|---|---|
| | Position of load θ (mm) | | | |
| | 0 | 20 | 30 | 50 |
| | Deflection (mm) | Def' | Def' | Def' |
| | Distortion angle (°) | Dis' | Dis' | Dis' |
| Comparative Example | 92.6 | 93.0 | 92.2 | 92.7 |
| | −0.1 | 1.5 | 1.8 | 3.4 |
| Experimental shaft 1 | 67.3 | 62.2 | 60.7 | 59.6 |
| | −8.0 | −4.0 | −1.7 | 3.9 |
| Experimental shaft 2 | 135.3 | 132.7 | 134.9 | 130.4 |
| | −4.4 | −1.6 | 0.3 | 3.0 |
| Experimental shaft 2 | 135.3 | 132.7 | 134.9 | 130.4 |
| | −4.4 | −1.6 | 0.3 | 3.0 |
| Experimental shaft 3 | 154.6 | 154.0 | 152.8 | 154.2 |
| | −1.6 | −0.6 | −0.3 | 1.0 |
| Experimental shaft 4 | 128.1 | 125.9 | 124.3 | 124.0 |
| | −3.5 | −1.8 | −1.0 | 0.8 |
| Experimental shaft 5 | 112.7 | 114.2 | 111.9 | 112.3 |
| | −1.7 | −0.4 | −0.1 | 1.3 |
| Experimental | 120.0 | 120.0 | 119.8 | 119.4 |

TABLE 4-continued

| | Result of experiments | | | |
|---|---|---|---|---|
| | Position of load θ (mm) | | | |
| | 0 | 20 | 30 | 50 |
| | Deflection (mm) | Def' | Def' | Def' |
| | Distortion angle (°) | Dis' | Dis' | Dis' |
| shaft 6 | −1.3 | 0.0 | 0.5 | 1.6 |
| Experimental shaft 7 | 121.2 | 119.3 | 119.8 | 117.9 |
| | −2.6 | −1.7 | −0.9 | 0.0 |

N.B. The weight used is 2.0 kg.

TABLE 5

| | Devidation of elastic principal axis (mm) |
|---|---|
| Comparative example | 0.0 |
| Experimental shaft 1 | 35.7 |
| Experimental shaft 2 | 29.3 |
| Experimental shaft 3 | 33.7 |
| Experimental shaft 4 | 41.0 |
| Experimental shaft 5 | 28.6 |
| Experimental shaft 6 | 20.8 |
| Experimental shaft 7 | 47.2 |

As is made clear from the above experiments, according to the present invention, the elastic principal axis of the golf club shaft can be set at a desired position by changing the material, angle of fibers, position or arrangement of parts where the angle of fibers is made different, etc. Therefore, it is possible to set the elastic principal axis at the end of the club shaft so as to pass the center of gravity of the club head and/or the geometric center of gravity of the scoring area.

When the elastic principal axis at the end of the present shaft is set to pass the center gravity of the scoring area, distortion or twist of the club shaft when the player strikes or impacts the club against the golf ball to add a repulsion force to the scoring area, is reduced or eliminated. The face of the club is prevented from rotating relative to the club shaft, thus ensuring a square hit of the golf ball.

Similarly, as the elastic principal axis at the end of the golf club shaft is set to pass the center of gravity of the club head, distortion of the shaft due to the inertial force caused by the weight of the club head when the player swings the shaft is reduced or eliminated. As a result, the golf ball flies in a straight path.

The pipe-shaped structural member of the present invention can be used as a robot arm as described earlier. Such embodiment will now be discussed hereinbelow.

A robot arm 215 shown in FIG. 52 is used in a robot 211 for painting. A rotary unit 213 constituting a working body and rotating around an axis K in a direction shown by an arrow M is provided on a main body 212. One end of the robot arm 215 is fixed to an end face 213a of the rotary unit 213, so that the end becomes a fixed end 215a. The other end of the robot arm 215 is a free end 215b equipped with a spray gun 216 for painting use. The center of gravity N of the weight of the spray gun 216 is separated a distance l6=50 mm from the geometric principal axis Ġ of the robot arm 215.

Figure 54:
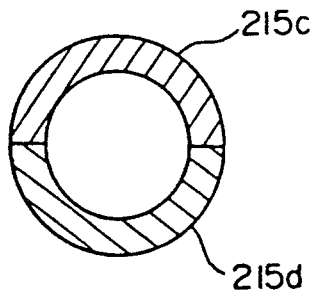
FIG. 54 is a cross sectional view taken along a line III—III of FIG. 53.
Figure 55:
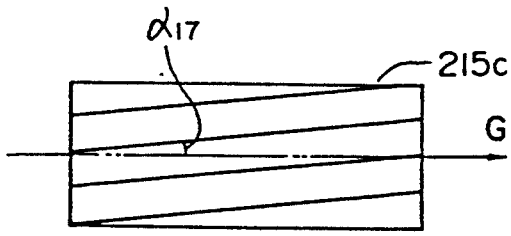
FIGS. 55 and 56 are schematic views for explanation of an angle of fibers in the robot arm.
Figure 56:
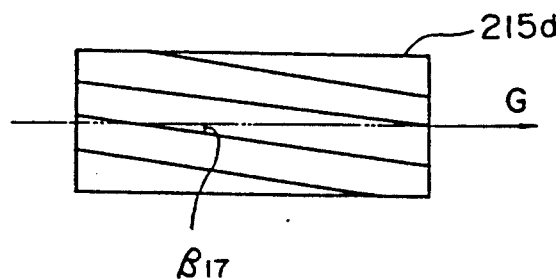

The pipe-shaped robot arm 215 is made of FRP (carbon fiber reinforced epoxy composite material). As shown in FIG. 53, the robot arm 215 has a length L from the fixed end 215a to the free end 215b of 1000 mm, an inner diameter ID3 of 20 mm and an outer diameter OD3 of 23 mm. The material, the angle of the fibers and the parts where the fibers angles are changed are set so that the elastic principal axis E4 at the free end 215b in a vertical direction to the rotating direction M, passes the center of gravity N of the spray gun 216. In other words, in the circular cylindrical coordinates wherein the geometric principal axis G agrees with the axis, at the part 215c of the robot arm 215 where $0° \leq \theta < 180°$, the fiber angle $\alpha 17$ is set to be 5°, whereas at the part 215d where $180° \leq \theta 360°$, the fiber angle $\beta 17$ is $-5°$, regardless of Z or r as indicated in FIGS. 54 through 56. 12 prepreg sheets are laminated in each part 215c or 215d.

The robot arm 215 is manufactured in the same way as the aforementioned golf club shaft, and accordingly the description thereof will be abbreviated.

Since the angle of fibers at a part in a circumferential direction of the robot arm 215 is made different from that at other parts thereof, and moreover said part is a part in a thicknesswise direction, the deviation produces between the geometric principal axis and the elastic principal axis E4, whereby the elastic principal axis E4 passes the center of gravity N of the spray gun 216.

When the rotary unit 213 starts or stops rotating, the inertial force of the spray gun 216 works on the elastic principal axis E4, adding a load to a point on the elastic principal axis E4. As a result, a bending and twisting moment is applied to the robot arm 215. However, although the robot arm 215 deflects, it never twists. Deflecting vibrations are generated, but twisting vibrations are not brought about. Accordingly, the stopping accuracy of the robot arm can be improved by controlling only the vibration of the deflection, making it possible to focus the spray gun 216 correctly on an object to be painted.

Figure 57:
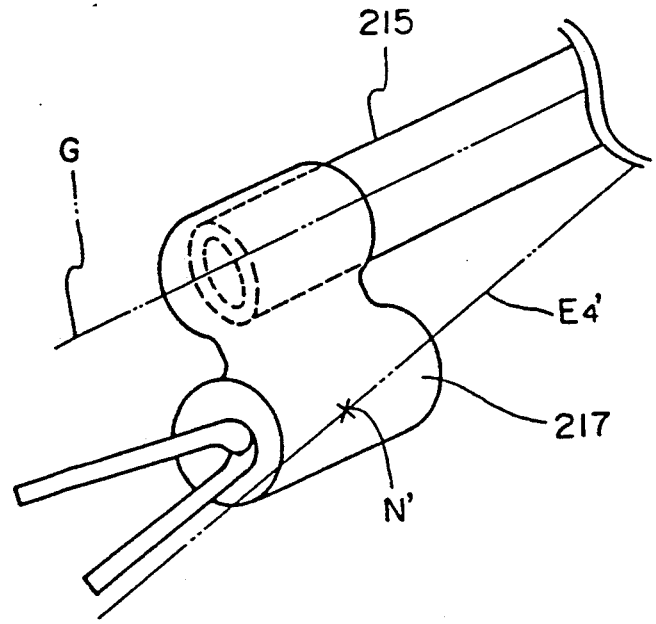
FIG. 57 a schematic perspective view of the robot arm equipped with a robot hand.

If a robot hand 217 is mounted in place of the spray gun 216 as shown in FIG. 57, and when the robot arm is set so that the elastic principal axis E4' passes the center of gravity N' of the robot hand 217, no twisting vibrations are generated, even when the robot hand 217 starts or stops rotation. Therefore, the positioning accuracy of the robot hand 217 can be improved when it is moved to carry a object (not shown).

Figure 58:
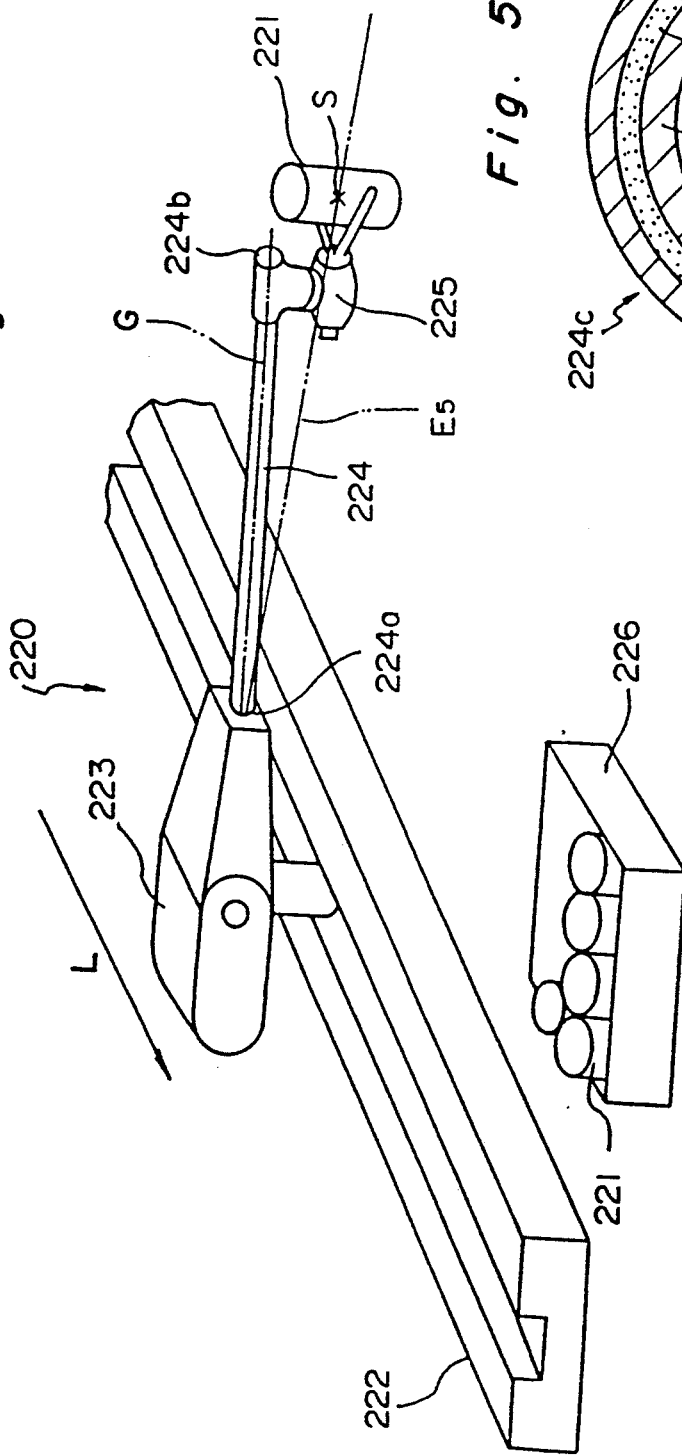
FIG. 58 is a schematic perspective view of a robot machine provided with a robot arm according to another embodiment of the present invention.

A modified robot arm is shown in FIG. 58. A robot 220 transfers an object 221, which is so constituted that a moving body 223 as a working element is reciprocally moved on a rail 222 by a driving mechanism (not shown). The robot arm 224 has its one end 224a fixed to the moving body 223 and the other free end 224b equipped with a robot hand 225 having pincer-like fingers. The robot 220 transfers the object 221 stored in a stock box (not shown) at the upper right side of FIG. 58 to a predetermined position within a pallet 226 at the left side.

Figure 59:
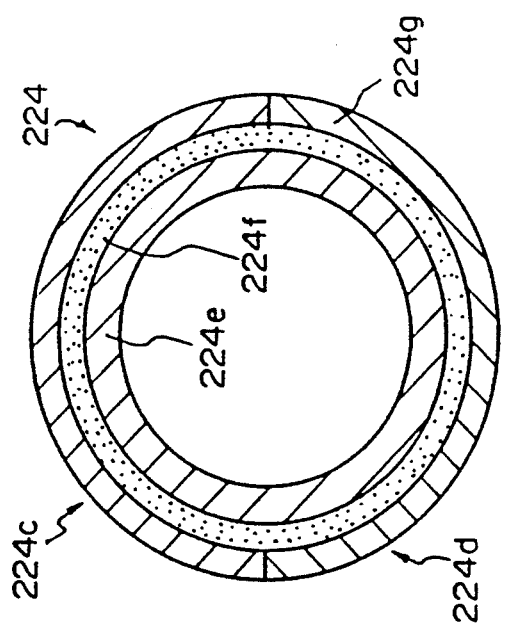
FIG. 59 is a cross sectional view of the robot arm of FIG. 58.

As shown in FIG. 59, at a first part 224c of the robot arm 224 where $0° \leq \theta < 180°$, three pairs of prepreg sheets in which each pair consists of two sheets, one of the pair having a fiber angle 45° and the other of said pair having a fiber angel $-45°$, are laminated at the innermost side, and three layers having a fiber angle 0° and three layers having a fiber angle 30° are further overlapped thereoutside.

Meanwhile, at a second part 224d where $180° \leq \theta < 360°$, three pairs of prepreg sheets in which each pair consists of two sheets, one having a fiber angle 45° and the other having a fiber angle $-45°$ are laminated at the innermost side, with three layers having a fiber angle of 0° and another three layers having a fiber angle of $-30°$ are further overlapped thereoutside.

Accordingly, since the angle of fibers of the robot arm 224 is made different partially in the circumferential direction, and moreover, at a part in a thicknesswise direction of the circumferential part, the elastic principal axis E5 of the robot arm 224 passes the center of gravity S of the weight of both the robot hand 225 and object 221.

When the robot hand starts to move or stops while it is holding the object 221, the inertial force of the robot hand 225 and object 221 work on the elastic principal axis E5, adding a load to a point of the robot arm 224 on the elastic principal axis E5. As a result, a bending and twisting moment is applied to the robot arm 224. However, the robot arm 224 according to the present invention never twists, without generating twisting vibrations. Therefore, the object 221 can be carried to a predetermined position in the pallet 226 with high accuracy.

<<Experiments>>

It is made clear from the following experiments that the elastic principal axis of the robot arm of the present invention can be set at a desired position.

Seven experimental robot arms 8 through 14 having a laminated constitution as tabulated in Table 6 below are used for comparison with a comparative example. The elastic principal axis and geometric principal axis agree with each other in the comparative example.

Although an outer layer of the experimental arm 11 (marked with * in Table 6) is made of boron fiber reinforced epoxy resin, all of the other arms are made of carbon fiber reinforced epoxy resin.

The experiments are conducted in the same manner as in the case of the above-described golf club shaft. More specifically, as indicated in FIG. 6, the tool 12 is inserted to the free end of the robot arm which is fixed at one end thereof, and the weight 13, namely 2.0 kg, is suspended 0 mm away from the geometric principal axis G. Moreover, as shown in FIG. 7, the position of the weight 16 is changed by the rod 15a of the tool 15 to 30, 50 and 70 mm from the geometric principal axis G.

TABLE 6

| | | Constitution of lamination in each experimental example | | | |
|---|---|---|---|---|---|
| | | Constitution of lamination (orientating direction of fibers, number of laminations) | | | |
| | | Circumferential position | | | |
| | | $0 \leq \theta < 180$ | | $180 \leq \theta < 360$ | |
| Comparative example | Inside | 45°<br>$-45°$ | 3 layers | 45°<br>$-45°$ | 3 layers |
| | Outside | 0° | 6 layers | 0° | 6 layers |
| Experimental arm 8 | | 5° | 12 layers | $-5°$ | 12 layers |
| Experimental arm 9 | Inside | 0° | 6 layers | 0° | 6 layers |
| | Outside | 10° | 6 layers | $-10°$ | 6 layers |

TABLE 6-continued

Constitution of lamination in each experimental example

Constitution of lamination (orientating direction of fibers, number of laminations)

| | | Circumferential position | | | |
|---|---|---|---|---|---|
| | | $0 \leq \theta < 180$ | | $180 \leq \theta < 360$ | |
| Experimental arm 10 | Inside | 35°⎤<br>−35°⎦ | 5 layers | 35°⎤<br>−35°⎦ | 5 layers |
| | Outside | 15° | 2 layers | −15° | 2 layers |
| Experimental arm 11 | Inside | 0° | 6 layers | 0° | 6 layers |
| | Outside | 10° | 6* layers | −10° | 6* layers |
| Experimental arm 12 | Inside | 45°⎤<br>−45°⎦ | 3 layers | 45°⎤<br>−45°⎦ | 3 layers |
| | | 0° | 4 layers | 0° | 4 layers |
| | Outside | 10° | 2 layers | −10° | 2 layers |
| Experimental arm 13 | Inside | 45°⎤<br>−45°⎦ | 3 layers | 45°⎤<br>−45°⎦ | 3 layers |
| | | 0° | 4 layers | 0° | 4 layers |
| | Outside | 30° | 2 layers | −30° | 2 layers |
| Experimental arm 14 | Inside | 45°⎤<br>−45°⎦ | 3 layers | 45°⎤<br>−45°⎦ | 3 layers |
| | | 0° | 3 layers | 0° | 3 layers |
| | Outside | 30° | 3 layers | −30° | 3 layers |

N.B.: $\begin{matrix}45°\\-45°\end{matrix}$ represents that one layer having an angle of fibers 45° and one layer having an angle of fibers −45° are combined to be one layer.

TABLE 7

Result of experiments

| | Position of load 1 (mm) | | | |
|---|---|---|---|---|
| | 0 | 30 | 50 | 70 |
| | Deflection (mm)<br>Distortion angle (°) | Def'<br>Dis' | Def'<br>Dis' | Def'<br>Dis' |
| Comparative Example | 21.9<br>0.01 | 11.0<br>0.19 | 20.1<br>0.37 | 22.0<br>0.48 |
| Experimental arm 8 | 14.3<br>−1.24 | 13.8<br>−0.46 | 13.3<br>0.04 | 12.8<br>0.50 |
| Experimental arm 9 | 14.2<br>−1.00 | 13.7<br>−0.35 | 13.3<br>0.03 | 13.0<br>0.47 |
| Experimental arm 10 | 34.2<br>−0.27 | 34.0<br>−0.13 | 34.0<br>−0.01 | 33.9<br>0.08 |
| Experimental arm 11 | 10.5<br>−1.18 | 9.8<br>−0.66 | 9.6<br>−0.37 | 9.1<br>−0.01 |
| Experimental arm 12 | 21.9<br>−0.18 | 21.9<br>0.01 | 21.8<br>0.17 | 21.7<br>0.30 |
| Experimental arm 13 | 25.9<br>−0.29 | 25.8<br>−0.10 | 25.7<br>0.02 | 25.6<br>0.14 |
| Experimental arm 14 | 29.5<br>−0.46 | 29.2<br>−0.27 | 29.1<br>−0.16 | 28.9<br>−0.04 |

N.B. The weight used is 2.0 kg.

TABLE 8

| | Devidation of elastic principal axis (mm) |
|---|---|
| Comparative example | 0.0 |
| Experimental arm 8 | 49.2 |
| Experimental arm 9 | 47.6 |
| Experimental arm 10 | 53.4 |
| Experimental arm 11 | 71.2 |
| Experimental arm 12 | 27.0 |
| Experimental arm 13 | 47.0 |
| Experimental arm 14 | 77.1 |

Figure 60:
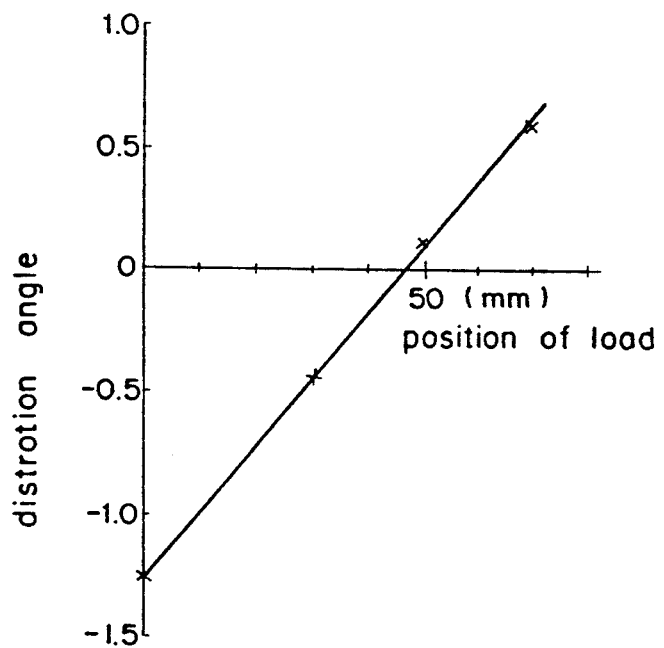
FIG. 60 is a graph showing the result of experiments using an experimental robot arm 8.
Figure 61:
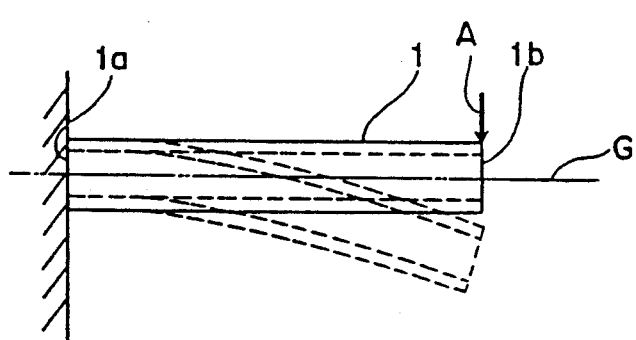
FIGS. 61 through 64 are schematic views showing the deformation of a pipe-shaped structural member made of isotropic material when applied with a load at the free end thereof.
Figure 62:
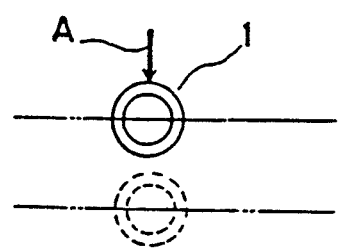
Figure 63:
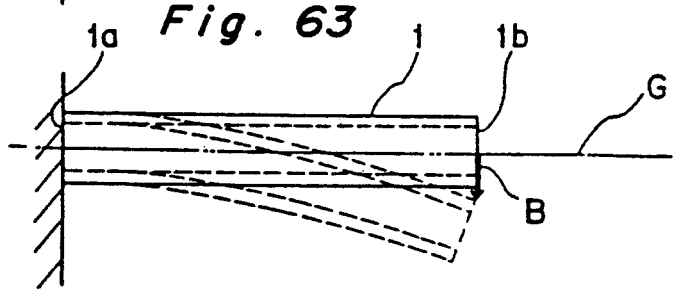
Figure 64:
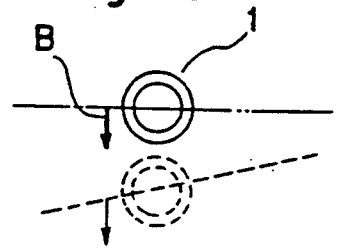
Figure 65:
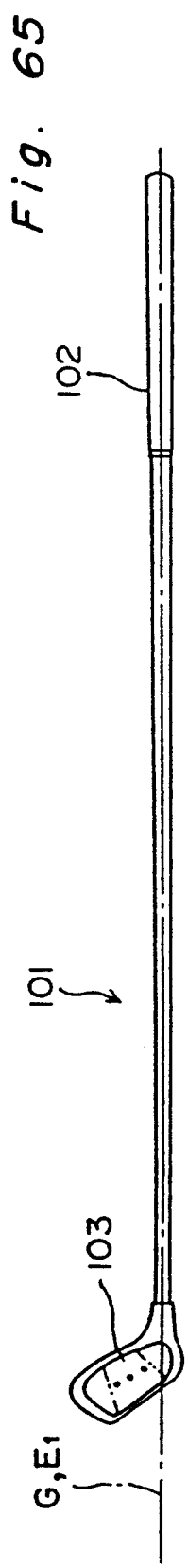
FIG. 65 is a figure of a general golf club shaft.
Figure 66:
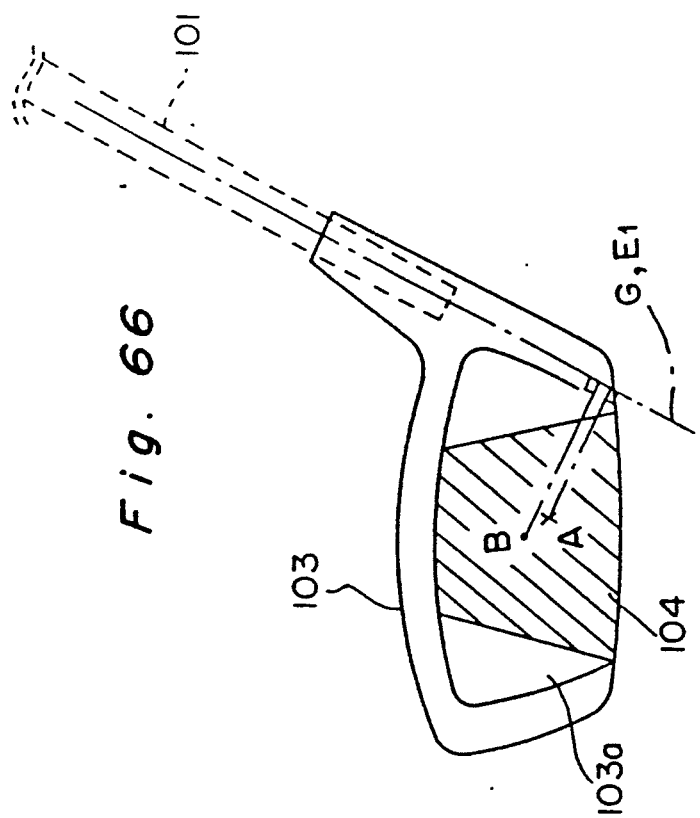
FIG. 66 is a partially enlarged view of FIG. 65.
Figure 67:
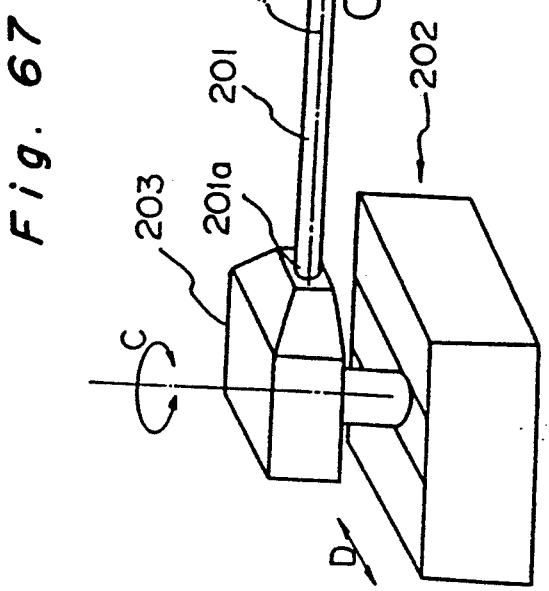
FIG. 67 is a schematic perspective view of a general robot mechanism.

The deflection and distortion of each arm are as indicated in Table 7 above. When a graph in FIG. 60 for the experimental arm 8 is formulated using Table 7, it is understood that the elastic principal axis at the end of the robot arm is shifted 49.2 mm. The position of the elastic principal axis at the end of each of the other experimental arms is also shifted as is known from Table 8.

By changing the material, angle of fibers and position of the parts where the angle of fibers is made different in the robot arm of the present invention, the elastic principal axis can be set at a desired position. Therefore, it is possible to determine the position of the elastic principal axis at the end of the robot arm so that the elastic principal axis passes the center of gravity of a mounting member such as the robot hand or the center of gravity of both the mounting member and an object to be carried by the mounting member.

When the position of the elastic principal axis is set in the above-described fashion, the robot arm can be prevented from being twisted because of the inertial force of the mounting member when the robot arm starts or stops parallel movement or rotary movement, and accordingly twisting vibrations can be prevented.

Although the present invention has been fully described by way of example with reference to the accompanying drawings, various changes and modifications would be apparent to those skilled in the art. Such changes and modifications should be construed as defined by the appended claims unless they depart from the scope of the present invention.

What is claimed is:

1. A pipe-shaped structural member made of an elongated cylindrical shaped resin having a predetermined thickness measured in the radial direction thereof, comprising:

a first part of said cylindrical shape resin extending in an arc along a circumferential direction at an angle greater than 0° and less than 360°;

unidirectional reinforcing fibers embedded in said first part for reinforcing said member in a first direction;

a second part of said cylindrical shape resin extending in an arc along a circumferential direction at an angle which compliments the angle of the first part to equal 360°;

unidirectional reinforcing fibers embedded in said second part for reinforcing said member in a second direction which is different from said first direction, said first part being located at a position different from said second part in the circumferential direction of said member, and each of said first and second parts being formed as, at least, a portion of said member in the radial direction.

2. The pipe-shaped structural member as claimed in claim 1, wherein said member is a golf club shaft.

3. The pipe-shaped structural member as claimed in claim 2, wherein the angle of the reinforcing fibers is made different partially in the circumferential direction thereof, and at least in a part in the radial direction thereof, whereby the elastic principal axis at a free end where a golf club head is mounted, with the other end thereof where a grip is formed being the fixed end, is able to be set at a predetermined position.

4. The pipe-shaped structural member as claimed in claim 3, wherein said elastic principal axis in a vertical direction to a face of said golf club is so set as to pass the center of gravity of said club head.

5. The pipe-shaped structural member as claimed in claim 3, wherein said elastic principal axis in a vertical direction to a face of said club head is so set as to pass the center of gravity of the scoring area of said face.

6. The pipe-shaped structural member as claimed in claim 3, wherein said elastic principal axis at the end of said club shaft, in the vertical direction to the face thereof is shifted 20-50 mm from the geometric principal axis thereof when said shaft is fixed at a point 200 mm from the end of the grip.

7. The pipe-shaped structural member as claimed in claim 1, wherein said member is used as a robot arm having one end fixed to a working body and the other free end thereof coupled to a mounting member, which carries an object.

8. The pipe-shaped structural member as claimed in claim 7, wherein the mounting member is a robot hand.

9. The pipe-shaped structural member as claimed in claim 7, wherein the object is a spray gun.

10. The pipe-shaped structural member as claimed in claim 7, wherein the angle of the reinforcing fibers is made different partially in the circumferential direction thereof, and at least in a part in the radial direction thereof, whereby the elastic principal axis can be set at a predetermined position.

11. The pipe-shaped structural member as claimed in claim 10, wherein said elastic principal axis is so set as to pass the center of gravity of said mounting member.

12. The pipe-shaped structural member as claimed in claim 10, wherein said elastic principal axis is so set as to pass the center of gravity of both of said mounting member and an object to be carried by said mounting member.

13. A pipe-shaped structural member made of an elongated cylindrical shaped resin having a predetermined thickness measured in the radial direction thereof, comprising:

a first part of said cylindrical shape resin extending in an arc along a circumferential direction at an angle greater than 0° and less than 360°;

unidirectional reinforcing fibers embedded in said first part for reinforcing said member in a first direction;

a second part of said cylindrical shape resin extending in an arc along a circumferential direction at an angle greater than 0° and less than 360°;

unidirectional reinforcing fibers embedded in said second part for reinforcing said member in a second direction which is different from said first direction, the remaining parts of said cylindrical shape resin extending in an arc along the circumferential direction at an angle which complements the sum of angles of said first and second parts, to equal 360°;

unidirectional reinforcing fibers embedded in said remaining parts for reinforcing said member in a direction which is different from said first and second directions;

said first part being located at a position different from said second part and said remaining parts in the circumferential direction of said member, and each of said first, second and remaining parts being formed, at least, as a portion of said member in the radial direction.

14. The pipe-shaped structural member as claimed in claims 1 or 13, wherein the location and size of the first part with respect to the second part is determined so as to produce the elastic principal axis of said member at a predetermined position.

15. The pipe-shaped structural member as claimed in claims 1 or 13, wherein said first part is arranged symmetrically with respect to said second part about a geometric principal axis of said member.

16. The pipe-shaped structural member as claimed in claim 15, wherein the angle of the fibers to the geometric principal axis at said first part, where $0° \leq \theta < 180°$, is made different from said second part, where $180° \leq \theta < 360°$, in the circular cylindrical coordinates of the member.

17. The pipe-shaped structural member as claimed in claim 16, wherein when angle of the fibers in said first part, where $0° \leq \theta < 180°$, is oriented in a positive direction to the geometric principal axis, the angel of the fibers in said second part, where $180° \leq \theta < 360°$, is oriented in a negative direction to the geometric principal axis.

18. The pipe-shaped structural member as claimed in claim 13, wherein said member is a golf club shaft.

19. The pipe-shaped structural member as claimed in claim 13, wherein said member is used as a robot arm having one end fixed to a working body and the other free end thereof coupled to a mounting member which carries an object.

20. A pipe-shaped structural member made of an elongated cylindrical shaped rubber having a predetermined thickness measured in the radial direction thereof, comprising:

a first part of said cylindrical shape rubber extending in an arc along a circumferential direction at an angle greater than 0° and less than 360°;

unidirectional reinforcing fibers embedded in said first part for reinforcing said member in a first direction;

a second part of said cylindrical shape rubber extending in an arc along a circumferential direction at an angle which compliments the angle of the first part to equal 360°;

unidirectional reinforcing fibers embedded in said second part for reinforcing said member in a second direction which is different from said first direction, said first part being located at a position different from said second part in the circumferential direction of said member, and each of said first and second parts being formed as, at least, a portion of said member in the radial direction.

21. A pipe-shaped structural member made of an elongated cylindrical shaped rubber having a predetermined thickness measured in the radial direction thereof, comprising:

a first part of said cylindrical shape rubber extending in an arc along a circumferential direction at an angle greater than 0° and less than 360°;

unidirectional reinforcing fibers embedded in said first part for reinforcing said member in a first direction;

a second part of said cylindrical shape rubber extending in an arc along a circumferential direction at an angle greater than 0° and less than 360°;

unidirectional reinforcing fibers embedded in said second part for reinforcing said member in a second direction which is different from said first direction, the remaining parts of said cylindrical shape rubber extending in an arc along the circumferential direction at an angle which compliments the sum of angles of said first and second parts to equal 360°;

unidirectional reinforcing fibers embedded in said remaining parts for reinforcing said member in a direction which is different from said first and second directions;

said first part being located at a position different from said second part and said remaining parts in the circumferential direction of said member, and each of said first, second and remaining parts being formed, at least, as a portion of said member in the radial direction.

22. The pipe-shaped structural member as claimed in claims 20 or 21, wherein the location and size of the first part with respect to the second part is determined so as to produce an elastic principal axis of said member at a predetermined position.

23. The pipe-shaped structural member as claimed in claims 20 or 21, wherein said first part is arranged symmetrically with respect to said second part about a geometric principal axis of said member.

* * * * *